: US 9,410,590 B2
(45) Date of Patent: Aug. 9, 2016

(54) ACTUATOR ASSEMBLY FOR ELECTROMECHANICAL PARKING BRAKE

(71) Applicant: KEYANG ELECTRIC MACHINERY CO., LTD, Seoul (KR)

(72) Inventors: Woo Kyo Jang, Gyeonggi-do (KR); Chang Hwa Kim, Chungcheongnam-do (KR); Nam Hun Lee, Gyeonggi-do (KR); Seong Oh Lee, Gyeonggi-do (KR)

(73) Assignee: KEYAND ELECTRIC MACHINERY CO., LTD., Seoul (KR)

( * ) Notice: Subject to any disclaimer, the term of this patent is extended or adjusted under 35 U.S.C. 154(b) by 0 days.

(21) Appl. No.: 14/550,681

(22) Filed: Nov. 21, 2014

(65) Prior Publication Data

US 2015/0075923 A1 Mar. 19, 2015

Related U.S. Application Data

(63) Continuation of application No. PCT/KR2013/004259, filed on May 14, 2013.

(30) Foreign Application Priority Data

Apr. 17, 2013 (KR) .................. 10-2013-0042094

(51) Int. Cl.
*F16D 65/00* (2006.01)
*F16D 65/14* (2006.01)
(Continued)

(52) U.S. Cl.
CPC .............. *F16D 65/14* (2013.01); *B60T 7/107* (2013.01); *B60T 13/741* (2013.01); *F16D 65/0006* (2013.01); *F16D 65/18* (2013.01); *H02K 7/116* (2013.01); *F16D 2121/04* (2013.01);
(Continued)

(58) Field of Classification Search
CPC ............... F16D 65/0006; F16D 65/14; F16D 2500/50866
See application file for complete search history.

(56) References Cited

U.S. PATENT DOCUMENTS 3,708,925 A * 1/1973 Ainoura ............... B23F 19/052
451/47
7,021,415 B2 4/2006 Farmer et al.
(Continued)

FOREIGN PATENT DOCUMENTS

CN 1633373 6/2005
CN 1646823 7/2005
(Continued)

OTHER PUBLICATIONS

Korean Intellectual Property Office—Notice of Allowance Application No. 10-2013-0042094 Issued: Oct. 15, 2013 5 pages.
(Continued)

*Primary Examiner* — Robert A Siconolfi
*Assistant Examiner* — James Hsiao
(74) *Attorney, Agent, or Firm* — St. Onge Steward Johnston & Reens LLC

(57) ABSTRACT

An actuator assembly for an electromechanical parking brake greatly reduces vibration and noise of the actuator so that a high-quality vehicle may be realized by removing one of factors causing vibration and noise in the vehicle and greatly improves the easiness of assembly and handling together with attenuating vibration and noise by maximizing the excellent vibration and noise attenuating function by means of modularization which allows the actuator assembly to be handled as a single element.

17 Claims, 19 Drawing Sheets

(51) Int. Cl.
  *F16D 65/18*     (2006.01)
  *B60T 7/10*      (2006.01)
  *B60T 13/74*     (2006.01)
  *H02K 7/116*     (2006.01)
  *F16D 121/04*    (2012.01)
  *F16D 125/48*    (2012.01)
  *F16D 125/50*    (2012.01)
  *F16D 121/24*    (2012.01)

(52) U.S. Cl.
  CPC ......... *F16D2121/24* (2013.01); *F16D 2125/48* (2013.01); *F16D 2125/50* (2013.01)

(56) References Cited

U.S. PATENT DOCUMENTS

| | | | |
|---|---|---|---|
| 7,143,873 B2 | 12/2006 | Pascucci et al. | |
| 8,105,200 B2 | 1/2012 | Dettenberger et al. | |
| 8,186,488 B2 * | 5/2012 | Poertzgen | B60T 13/746 188/162 |
| 2004/0178028 A1 * | 9/2004 | Farmer | B60T 13/741 188/162 |
| 2006/0000679 A1 * | 1/2006 | Hanna | B60T 13/746 188/106 P |
| 2006/0096812 A1 | 5/2006 | Terradas et al. | |
| 2006/0113149 A1 | 6/2006 | Prat et al. | |
| 2007/0062769 A1 | 3/2007 | Noh | |
| 2007/0158148 A1 | 7/2007 | Ohtani et al. | |
| 2009/0050420 A1 | 2/2009 | Poertzgen | |
| 2010/0320041 A1 | 12/2010 | Seuser et al. | |
| 2011/0147143 A1 | 6/2011 | Park | |
| 2012/0325601 A1 * | 12/2012 | Giering | F16D 65/0006 188/162 |
| 2013/0180811 A1 * | 7/2013 | Poertzgen | B60T 13/741 188/156 |
| 2013/0203554 A1 | 8/2013 | Dettenberger et al. | |
| 2014/0041975 A1 | 2/2014 | Takewaki et al. | |

FOREIGN PATENT DOCUMENTS

| | | |
|---|---|---|
| CN | 1675096 | 9/2005 |
| CN | 101031459 | 9/2007 |
| DE | 102004048700 A1 | 5/2006 |
| DE | 102006007755 A1 | 8/2007 |
| DE | 102010032053 A1 | 1/2012 |
| JP | 101185539 B1 | 9/2012 |
| JP | 2012229741 A | 11/2012 |
| KR | 100819087 B1 | 1/2010 |
| KR | 20110011038 A | 2/2011 |
| KR | 20110026115 A | 3/2011 |
| KR | 20110072877 A | 6/2011 |
| KR | 20110093061 A | 8/2011 |
| KR | 20120048232 A | 5/2012 |
| WO | 2008046605 A1 | 4/2008 |
| WO | 2011076299 A1 | 6/2011 |
| WO | 2011076366 A1 | 6/2011 |

OTHER PUBLICATIONS

Korean Intellectual Property Office—Official Notice of Preliminary Rejection Application No. 10-2013-0042094 Issued: Jun. 19, 2013 12 pages.

* cited by examiner

ACTUATOR ASSEMBLY FOR ELECTROMECHANICAL PARKING BRAKE

FIELD OF THE INVENTION

The present disclosure relates to an actuator assembly for operating an electromechanical parking brake, and more particularly, to an actuator assembly for an electromechanical parking brake which greatly reduces vibration and noise of an actuator so that a high-quality vehicle may be realized by removing one of factors causing vibration and noise in the vehicle. Further, the present disclosure relates to an actuator assembly for an electromechanical parking brake which may improve the easiness of assembly and handling together with attenuating vibration and noise by maximizing the excellent vibration and noise attenuating function by means of modularization which allows the actuator assembly to be handled as a single element.

BACKGROUND OF THE INVENTION

An actuator of an electromechanical parking brake of a vehicle includes a motor and a power transmission unit for operating a friction pad installed at a caliper of a disc brake assembly during the vehicle parking.

For example, if a driver pushes a parking brake switch, the rotating force of the motor of the actuator is transmitted to an input shaft of the caliper through a power transmission unit such as a reducing gear. The rotation of the input shaft allows a pressurizing junction sleeve to advance, and the advancing of the pressurizing junction sleeve allows a piston received therein and a caliper housing to move closer to each other, so that two friction pads mounted to the piston and the caliper housing press both sides of the disc so that the disc is restricted not to rotate.

Patent documents 1 to 3 disclose various examples of the actuator of an electromechanical parking brake.

A traditional parking brake uses a cable-operating manner in which a driver pulls a cable to operate a friction pad or a brake lining.

In place of it, existing electromechanical parking brake actuators such as those disclosed in Patent documents 1 to 3 have been adopted to give convenience to a driver since a parking brake is operated by a motor.

The electromechanical parking brake gives convenience to a driver as described above. However, since a device of a new type is mounted, a vehicle designer encounters unfamiliar vibration and noise caused by the device. For this reason, a high-quality vehicle which winds the confidence of drivers may be provided when a study for regulating or removing such vibration and noise is accompanied.

For example, in an actuator for an electromechanical parking brake, the rotating force of a motor is transmitted to a planetary gear set through a power transmission gear or a power transmission belt, and the input shaft of a caliper rotates by the rotation of the output shaft of the planetary gear set.

In this power transmission process, together with vibration and noise caused by the operating motor, there are generated vibration, noise and strange sound due to collision, friction or backlash between gear teeth surfaces, which are also propagated out of the housing.

In addition, if the parking brake is not in operation, the vibration generated by an engine of a vehicle may be transferred to an actuator housing and cause resonance. The resonance of the actuator housing is harsh to the ear and may also be propagated to other surrounding elements to cause an unusual noise not experienced before.

Meanwhile, in order to improve convenience in assembly or supply of components or in order to reduce costs or improve productivity in this connection, a so-called 'modularized' manufacturing method in which various components are assembled in a sub-assembly form in advance to be handled as a single element is recently introduced to a vehicle.

If the parking brake actuator is modularized, a motor and a power transmission unit may be supplied as a single assembled module and thus they need not be newly assembled in a vehicle manufacturing factory. Therefore, this may give various advantages such as simplifying the vehicle assembling process and facilitating easier supply and management of components.

However, as another purpose for modularizing the actuator, the processes of producing and assembling actuator components may be entrusted to a specialized company so that the study for improving quality may be intensively performed.

The quality of the actuator naturally includes the quality in relation to vibration and noise as described above. Therefore, the study for minimizing vibration and noise and the study for designing a structure for modularization should be performed together and harmonized.

RELATED LITERATURES

Patent Document (Patent document 0001) Korean Patent Application Publication No. 10-2011-0093061
(Patent document 0002) Korean Patent Application Publication No. 10-2011-0011038
(Patent document 0003) Korean Patent Publication No. 10-0819087

SUMMARY OF THE INVENTION

The present disclosure is directed to implementing a high-quality vehicle by greatly decreasing vibration and noise of an actuator for an electromechanical parking brake so that one of factors causing vibration and noise of a vehicle is removed.

Further, the present disclosure is directed to improving a vibration and noise attenuating function by modularizing an actuator assembly so that two design concepts may be mutually supplemented and enhanced.

In one aspect, there is provided an actuator assembly for an electromechanical parking brake, wherein a casing of a motor and a gear housing of a planetary gear set are coupled to a lower surface of an inner housing in parallel, a reduction gear train having a pinion gear and a drive gear for transmitting a power from a rotary shaft of the motor to the planetary gear set is received in an upper surface of the inner housing, and an inner cap covering the outer portion of the reduction gear train is coupled to the upper surface of the inner housing, thereby configuring a primary module which is a single small independent assembly in which the motor, the reduction gear train, the planetary gear set, the inner housing and the inner cap are combined; wherein the primary module is inserted into an outer housing while keeping a gap at a circumference thereof, an outer cap is coupled to an upper portion of the outer housing to cover the primary module, and the primary module is surrounded by the outer housing and the outer cap, thereby configuring a final module which is a single large independent assembly in which inner components of the motor, the reduction gear train and the planetary gear set are surrounded doubly; and wherein a final output shaft of the planetary gear set is exposed from a lower through hole of the outer housing and connected to a parking brake.

In the actuator assembly for an electromechanical parking brake according to the present disclosure, the outer housing may have a bottom portion on which the lower surface of the inner housing is placed and a circumferential wall extending upwards at the circumference of the bottom portion to hide a side of the primary module, and a vibration-attenuating damper member may be installed in a space between a rim portion of the inner housing and the circumferential wall of the outer housing.

The damper member may have a coupling groove formed in a circumferential inner wall thereof, and a rim portion of the inner housing may be fit into the coupling groove.

The damper member may be assembled below the primary module to face upwards, a bottom portion may be formed at a lower end of the rim portion to closely adhere to the lower surface of the inner housing, and openings may be formed in the bottom portion to allow the casing of the motor and the gear housing of the planetary gear set to pass through.

In the actuator assembly for an electromechanical parking brake according to the present disclosure, the damper member may be made of an elastic flexible material, and an outer circumference thereof closely adhering to the inner side of the circumferential wall of the outer housing may have an uneven portion.

In the actuator assembly for an electromechanical parking brake according to the present disclosure, the outer housing may include a motor receiver extending downwards from the bottom portion and having a closed circumference and a closed bottom to accommodate the casing of the motor, and a planetary gear receiver extending downwards from the bottom portion and having a closed circumference and an open bottom to accommodate the gear housing of the planetary gear set.

In the actuator assembly for an electromechanical parking brake according to the present disclosure, a vibration and noise attenuating pad may be interposed between the outer circumference of the casing of the motor and the inner circumference of the outer housing.

The vibration and noise attenuating pad may be made of non-woven fabric, fiber, or pulp material.

In the actuator assembly for an electromechanical parking brake according to the present disclosure, a vibration-attenuating and gap-maintaining elastic ring may be interposed between an end surface of the casing of the motor and a bottom surface of the outer housing.

In the actuator assembly for an electromechanical parking brake according to the present disclosure, a shaft support for supporting the rotary shaft may protrude and extend from the lower portion of the casing of the motor, an accommodating unit for accommodating the shaft support may protrude and extend from the bottom of the outer housing, and a vibration-attenuating and gap-maintaining elastic ring for supporting the shaft support and the accommodating unit to keep a gap with each other in an axial direction and in a radial direction may be installed in a space between the shaft support and the accommodating unit.

In the actuator assembly for an electromechanical parking brake according to the present disclosure, a snap-fit strip having a coupling protrusion may extend at an end of one of the inner cap and inner housing toward the other thereof, and a snap-fit groove may be formed at the other thereof so that the snap-fit strip is inserted thereto and the coupling protrusion is hooked thereto.

In the actuator assembly for an electromechanical parking brake according to the present disclosure, the inner housing may include a bottom portion having a rim portion at an outer circumference thereof and a first noise dam extending to surround a periphery of the reduction gear train having the pinion gear and the drive gear installed at the upper surface of the bottom portion, the inner cap may have a second noise dam corresponding to a circumferential contour of the first noise dam, and end surfaces of the first and second noise dams may closely adhere to each other to prevent an operation noise generated from the reduction gear train therein from being propagated outwards.

In the actuator assembly for an electromechanical parking brake according to the present disclosure, a dowel plate for determining an assembling location may extend from one of the inner cap and the inner housing toward the other thereof, and a positioning groove may be formed in the other thereof so that the dowel plate is inserted thereto to take the position thereof.

In the actuator assembly for an electromechanical parking brake according to the present disclosure, a snap-fit strip having a snap-fit hole may extend from one of the lower surface of the inner housing and the gear housing of the planetary gear set toward the other thereof, and a snap-fit protrusion may be formed at the other thereof so that the snap-fit hole of the snap-fit strip is inserted and hooked thereto.

In the actuator assembly for an electromechanical parking brake according to the present disclosure, a skirt section may extend from the lower surface of the inner housing so that the gear housing of the planetary gear set is inserted thereto, and the gear housing of the planetary gear set may be inserted into the skirt section and snap-fit thereto.

A snap-fit strip having a snap-fit hole may extend from a skirt section of the inner housing, and a snap-fit protrusion may be formed at the outer circumferential surface of the gear housing of the planetary gear set to be inserted into and hooked by the snap-fit hole of the snap-fit strip.

In the actuator assembly for an electromechanical parking brake according to the present disclosure, a positioning groove for determining an assembling location of the gear housing of the planetary gear set may be formed at the skirt section of the inner housing, and a positioning protrusion may be formed at the outer circumferential surface of the gear housing of the planetary gear set to be inserted into the positioning groove to take the position thereof.

In the actuator assembly for an electromechanical parking brake according to the present disclosure, an outer terminal for supplying a power to the motor may include a horizontal portion connected to an outer connector, and a bent portion bent and extending from the horizontal portion, a terminal strip of the motor may include a bent portion closely adhering to the bent portion of the outer terminal in a surface-to-surface relation, and the bent portion of the outer terminal and the bent portion of the terminal strip may be joined by welding.

A part of the outer terminal, which includes the horizontal portion, may be integrated with the outer housing by means of insert injection molding.

In the actuator assembly for an electromechanical parking brake according to the present disclosure, the reduction gear train including the pinion gear and the drive gear may be made of a plastic injection molding product and may be configured with a helical gear.

If the actuator assembly for an electromechanical parking brake according to the present disclosure is used, vibration and noise may be reduced since a motor and a power transmission unit are received and assembled in a single inner housing, and the inner housing is also accommodated in an outer housing to attenuate the vibration and noise, thereby greatly decreasing the propagation of vibration and noise to the outside.

In addition, since vibration and noise is attenuated by the housing structure of the inner housing and the outer housing, the assembled structure of the inner housing and the outer housing and the assembled structure of the motor and the outer housing to the minimum, the propagation of vibration and noise to the outside may be minimized.

Moreover, since a power supply connector is closely adhered to perform surface contact and then welded to prevent vibration and short circuit, it is possible to elongate the life span of the connector link and ensure easier assembling.

In addition, the motor and the power transmission unit are primarily modularized together with the inner housing, which is also finally modularized with the outer housing, and also the vibration and noise attenuating structures are appropriately combined. By doing so, complex and synergistic effects of improving the quality of the overall actuator, reducing vibration and noise, and improving assembling and productivity may be provided.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF THE INVENTION

Figure 1:
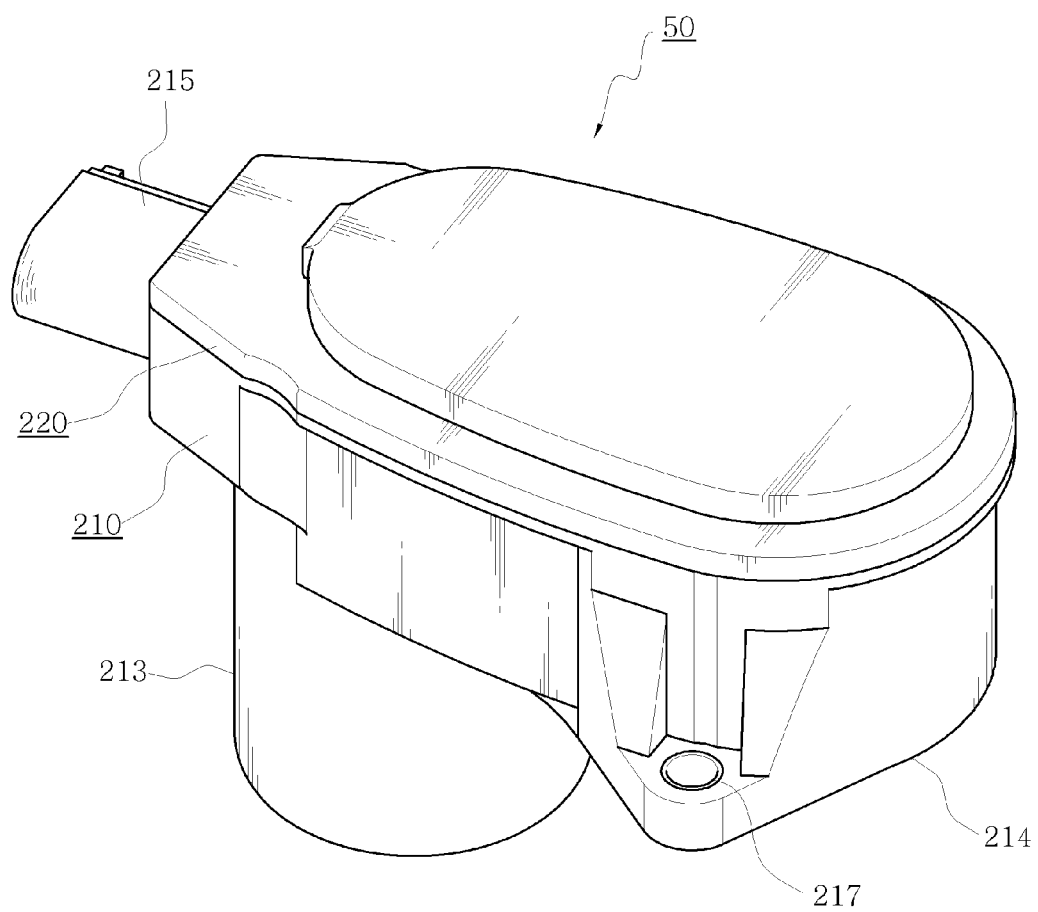
FIG. 1 is a perspective view showing a parking brake actuator assembly according to the present disclosure, observed from the above.

Hereinafter, an actuator assembly for an electromechanical parking brake according to an embodiment of the present disclosure will be described with reference to the accompanying drawings.

Terms used in this specification are to illustrate embodiments and not intended to limit the present disclosure.

In addition, spatially relative terms such as "below", "beneath", "lower", "above", "upper", "bottom", "ceiling" or the like may be used to explain correlations among components more easily as shown in the drawings. It should be understood that the spatially relative terms may include other directions of components in use or in operation in addition to those depicted in the drawings. For example, when a component depicted on a drawing is turned over, a component described as being "below" or "beneath" another component may be placed "above" the corresponding component.

Figure 2:
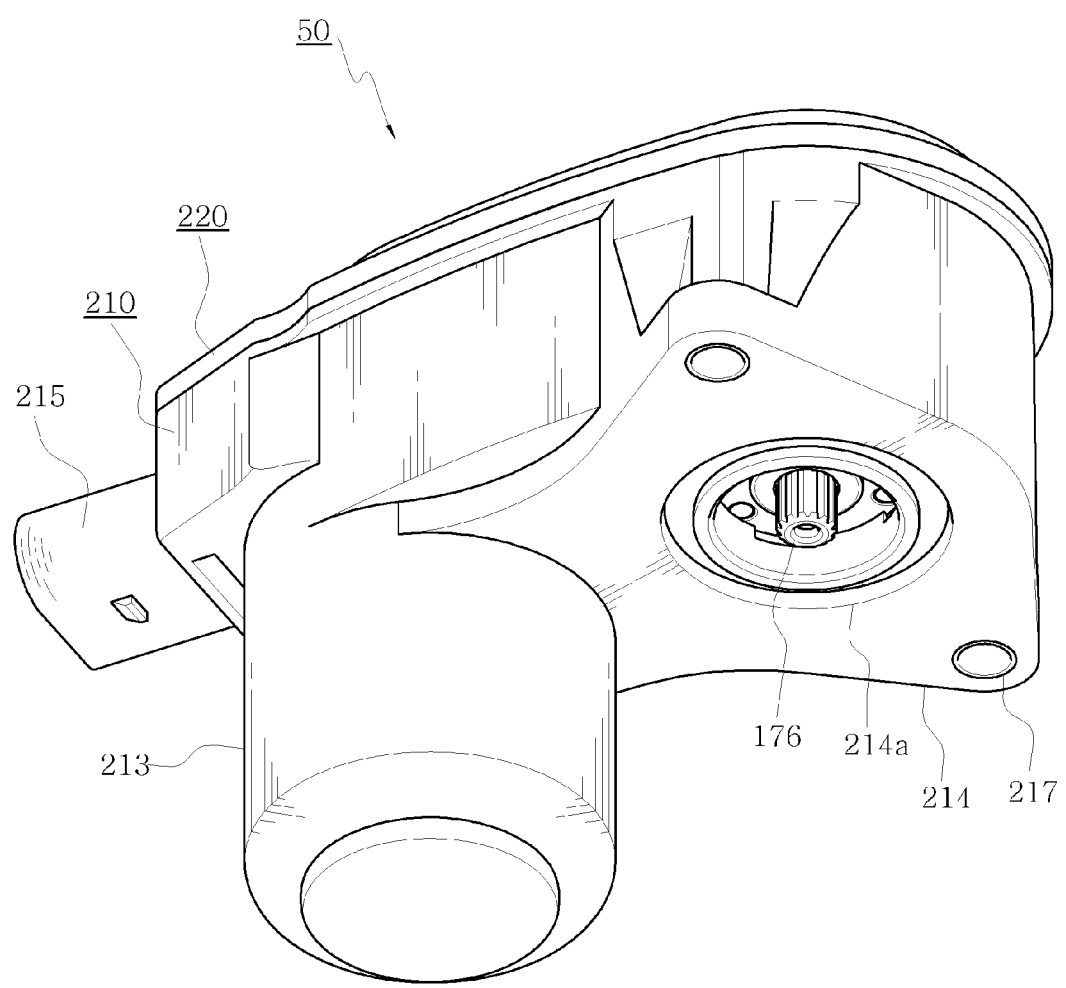
FIG. 2 is a perspective view showing the parking brake actuator assembly according to the present disclosure, observed from the below.

FIG. 1 is a perspective view showing a parking brake actuator assembly according to the present disclosure, observed from the above. FIG. 2 is a perspective view showing the parking brake actuator assembly according to the present disclosure, observed from the below.

Referring to FIGS. 1 and 2, in a completed state, an actuator assembly is composed of a final module 50 which is a single large assembly. The final module 50 accommodates a primary module in which a motor, a reduction gear train and a planetary gear set for operating a parking brake are assembled to configure a single small independent assembly.

The contour of the final module 50 is shaped to be surrounded by an outer housing 210 and an outer cap 220.

A junction sleeve 215 is provided at one side of the outer housing 210 to connect an external power connector. The motor is received in a motor receiver 213 of the outer housing 210. A terminal connected to a connector to apply a current to the motor is installed in the junction sleeve 215.

A lower through hole 214a is formed in the other side of the outer housing 210, namely in the lower portion of the planetary gear receiver 214. A final output shaft 176 of the planetary gear set exposes through the lower through hole 214a. A parking brake is connected to the final output shaft 176. For example, an input shaft of a caliper of a disc-type parking brake is coupled to the final output shaft 176.

The actuator assembly of the present disclosure includes the primary module which is a single small assembly in which the motor, the reduction gear train, the planetary gear set, the inner housing and the inner cap are combined, and the primary module is accommodated again in the outer housing 210 and the outer cap 220. Therefore, by using the structure in which inner components of the motor, the reduction gear train and the planetary gear set are surrounded by a double wall barrier or double wall noise dams, it is possible to attenuate vibration and noise and thus minimize propagation of the vibration and noise inwards or outwards.

In addition, by combining the actuator assembly with the final module 50 which is a unit element for handling, the above vibration and noise attenuating function may give a synergistic effect, for example improvement in assembling and productivity.

Hereinafter, a detailed embodiment of the actuator assembly of the present disclosure, namely the final module 50, will be described.

Figure 3:
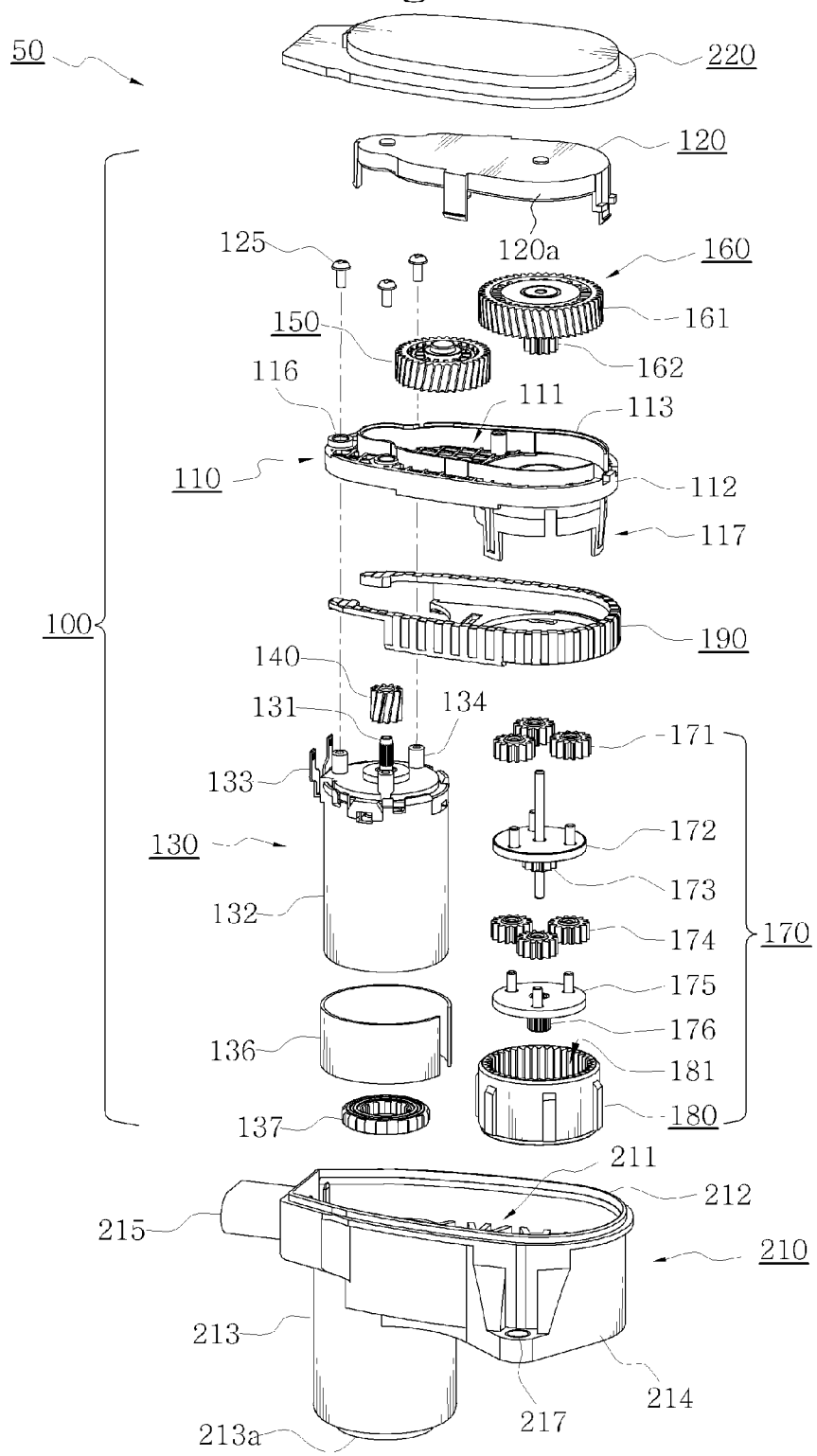
FIG. 3 is an exploded perspective view showing an overall parking brake actuator according to the present disclosure, observed from the above.
Figure 4:
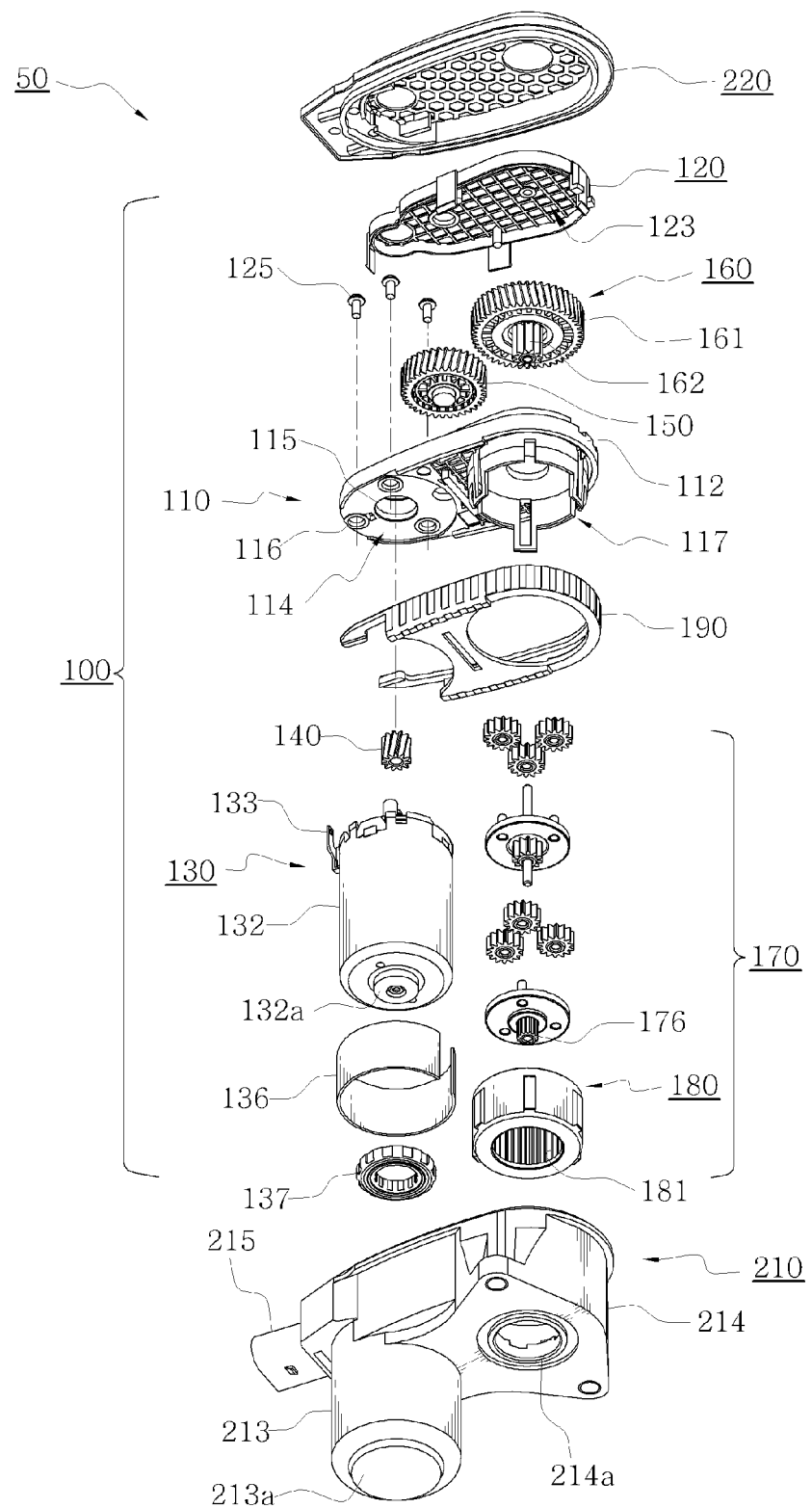
FIG. 4 is an exploded perspective view showing the overall parking brake actuator according to the present disclosure, observed from the below.

FIG. 3 is an exploded perspective view showing an overall parking brake actuator according to the present disclosure, observed from the above. FIG. 4 is an exploded perspective view showing the overall parking brake actuator according to the present disclosure, observed from the below.

Referring to FIGS. 3 and 4, a primary module 100 is configured by assembling an inner housing 110, a motor 130, a reduction gear train composed of a pinion gear 140, an idle gear 150 and a drive gear 160, a planetary gear set 170, and an inner cap 120.

The assembled primary module 100 is inserted into the outer housing 210 and the outer cap 220 together with a vibration and noise attenuating pad 136, a vibration-attenuating and gap-maintaining elastic ring 137 and a vibration-attenuating damper member 190.

A rotary shaft 131, a terminal strip 133 and a coupling boss 134 are provided at the upper surface of the motor 130. The pinion gear 140 is coupled to the rotary shaft 131.

A mount surface 114 closely adhering to the upper surface of the motor 130, a through hole 115 for allowing the pinion gear 140 of the motor 130 to pass, and a coupling hole 116 for the insertion of the coupling boss 134 are formed at the inner housing 110.

The upper surface of the motor 130 closely adheres to the mount surface 114 of the inner housing 110, the pinion gear 140 passes through the through hole 115 and protrudes on the upper surface of the inner housing 110, and the coupling boss 134 is inserted into the coupling hole 116 and coupled by a screw 125 to be fixed to the inner housing 110.

The inner housing 110 has a bottom portion 111. The outer circumference of the bottom portion 111 forms a rim portion 112. A reduction gear train for transmitting a power of the pinion gear 140 to the planetary gear set 170 is installed at the upper surface of the inner housing 110.

The reduction gear train includes a drive gear 160 for receiving the rotating force of the pinion gear 140 to drive the planetary gear set 170, and may additionally include an idle gear 150 between the pinion gear 140 and the drive gear 160. The pinion gear 140, the idle gear 150 and the drive gear 160 may be produced by injection-molding plastic material in order to reduce vibration and noise. In order to further improve the vibration and noise characteristics, a helical gear may be used instead of a general spur gear.

The reduction gear train including the pinion gear 140, the idle gear 150 and the drive gear 160 is installed on the upper surface of the inner housing 110 so that they are engaged while circumscribing with the central axes being arranged in parallel.

The drive gear 160 is configured as a single body having an input gear 161 engaged with the idle gear 150 and a first sun gear 162 for driving the planetary gear set 170.

The planetary gear set 170 is a complex planetary gear set configured in two stages, and the planetary gear set 170 reduces the rotation input from the drive gear 160 through two stages and then drives the parking brake.

The planetary gear set 170 includes a gear housing 180, which has a plurality of first pinion gears 171 engaged with the first sun gear 162 of the drive gear 160, a first carrier 172 for connecting the plurality of first pinion gears 171, a second sun gear 173 integrally formed at the first carrier 172, a plurality of second pinion gears 174 engaged with the second sun gear 173, a second carrier 175 for connecting the plurality of second pinion gears 174, a final output shaft 176 integrally formed at the second carrier 175, and an internal gear 181 inscribed with the first pinion gear 171 and the second pinion gear 174 and protects the entire planetary gear set 170. The gear housing 180 is fixed to the inner housing 110 not to rotate.

The planetary gear set 170 is mounted to the inner housing 110 in parallel to the motor 130.

The planetary gear set 170 is snap-fit to the inner housing 110. For this, a skirt section 117 extends from the lower surface of the inner housing 110, and the gear housing 180 of the planetary gear set 170 is simply assembled to the skirt section 117 by means of snap-fitting. The snap-fitting of the gear housing 180 will be described later in detail.

In addition, the inner housing 110 includes a first noise dam 113 extending upwards to surround the outer periphery of the reduction gear train installed at the upper surface of the bottom portion 111. Therefore, the periphery of the reduction gear train including the pinion gear 140, the idle gear 150 and the drive gear 160 is hidden and blocked by the first noise dam 113.

The inner cap 120 includes a second noise dam 120a which is shaped corresponding to the periphery contour of the first noise dam 113. Since the end surfaces of the first and second noise dams 113, 120a closely adhere to each other, the reduction gear train therein is covered by the first and second noise dams 113, 120a, thereby intercepting the propagation of operation noise of the reduction gear train to the outside.

If the bottom portion 111 of the inner housing 110 and the ceiling surface 123 of the inner cap 120 are formed unevenly to have a lattice shape as shown in the figures, the soundproof or sound-isolating function may be enhanced.

The outer housing 210 has a bottom portion 211 on which the lower surface of the inner housing 110 is placed. A circumferential wall 212 is formed above the bottom portion 211 to accommodate the inner housing 110. A motor receiver 213 for receiving the casing 132 of the motor 130 and a planetary gear receiver 214 for receiving the gear housing 180 of the planetary gear set 170 are provided below the bottom portion 211.

The motor receiver 213 has a closed circumference and a closed bottom in order to block the circumference and bottom of the casing 132 of the motor 130. In addition, the planetary gear receiver 214 has a closed circumference and an open bottom in order to block the circumference of the gear housing 180 of the planetary gear set 170 and draw the final output shaft 176.

A junction sleeve 215 for connecting an external power supply connector is formed at one side of the outer housing 210 in order to supply a power to the motor 130. The motor is received in the motor receiver 213 of the outer housing 210. An outer terminal 216 connected to an outer connector is installed in the junction sleeve 215.

The vibration-attenuating damper member 190 is installed in a space between the rim portion 112 of the inner housing 110 and the circumferential wall 212 of the outer housing 210. By means of the vibration-attenuating damper member 190, it is possible to attenuate or block the vibration and noise propagating between the inner housing 110 and the outer housing 210.

In addition, the vibration and noise attenuating pad 136 is interposed between the outer circumference of the casing 132 of the motor 130 and the inner circumference of the outer housing 210. In addition, the vibration-attenuating and gap-maintaining elastic ring 137 is interposed between an end surface 132b of the casing 132 of the motor 130 and the bottom surface of the outer housing 210.

The vibration and noise attenuating pad 136 and the elastic ring 137 may be assembled with the motor 130 in advance to configure the primary module 100.

Figure 5:
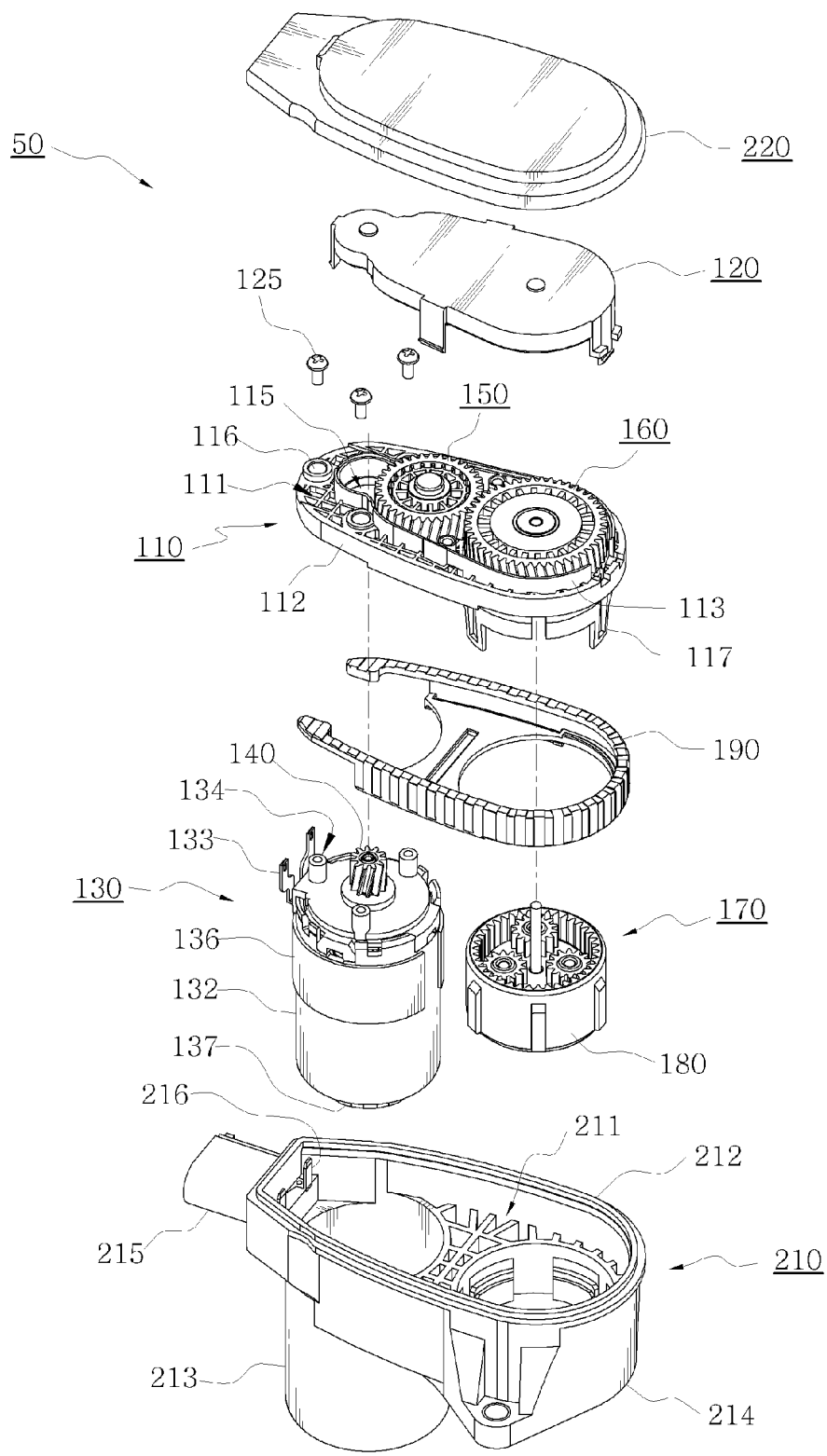
FIG. 5 is an exploded perspective view for illustrating an assembling process and a state of a primary module of the parking brake actuator according to the present disclosure.
Figure 6:
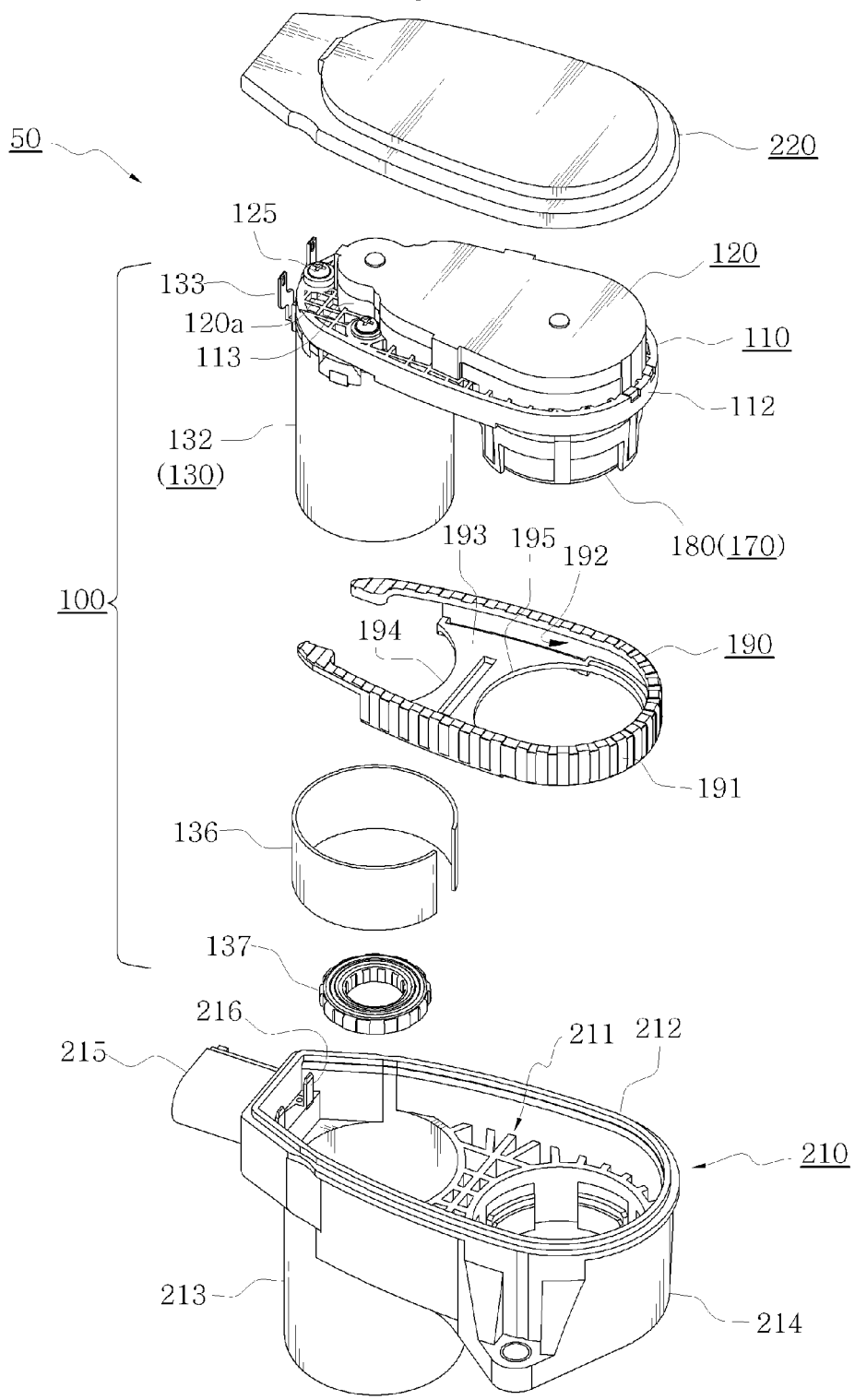
FIG. 6 is an exploded perspective view showing an assembled state of the primary module of the parking brake actuator according to the present disclosure.
Figure 7:
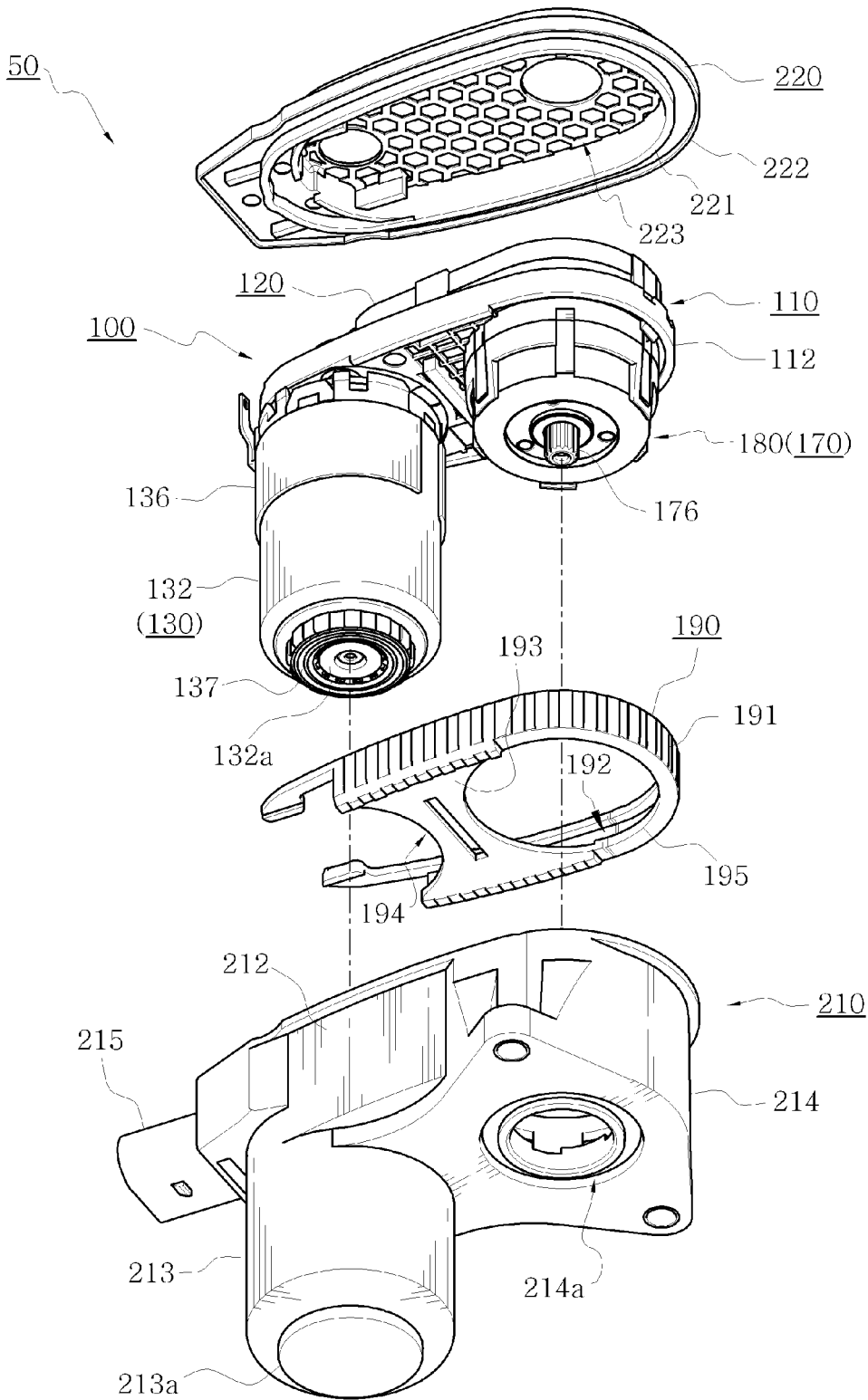
FIG. 7 is a perspective view of FIG. 6, observed from the below.

FIG. 5 is an exploded perspective view for illustrating an assembling process and a state of a primary module of the parking brake actuator according to the present disclosure. FIG. 6 is an exploded perspective view showing an assembled state of the primary module of the parking brake actuator according to the present disclosure. FIG. 7 is a perspective view of FIG. 6, observed from the below.

Referring to FIG. 5, when assembling the primary module 100, the reduction gear train including the pinion gear 140, the idle gear 150 and the drive gear 160 is installed in the first noise dam 113 formed at the upper portion of the bottom surface 111 of the inner housing 110.

Referring to FIG. 6 together with FIG. 5, the upper surface of the motor 130 closely adheres to the mount surface 114 (see FIG. 4) of the inner housing 110, the pinion gear 140 of the motor 130 passes through the through hole 115, and the coupling boss 134 is inserted into the coupling hole 116. Subsequently, the screw 125 is coupled to fix the coupling boss 134.

The gear housing 180 of the planetary gear set 170 is assembled to the skirt section 117 of the inner housing 110 by means of snap-fitting.

The vibration and noise attenuating pad 136 and the vibration-attenuating and gap-maintaining elastic ring 137 may be inserted into the casing 132 of the motor 130 to serve as a component of the primary module 50 (see FIGS. 5 and 7).

The inner housing 110 includes the first noise dam 113 extending upwards to surround the periphery of the reduction gear train installed at the upper surface of the bottom portion 111. Therefore, the periphery of the reduction gear train including the pinion gear 140, the idle gear 150 and the drive gear 160 is hidden and blocked by the first noise dam 113.

The inner cap 120 is coupled by closely adhering the end surface of its second noise dam 120a to the end surface of the first noise dam 113 of the inner housing 110. By doing so, the reduction gear train is covered by the first and second noise dams 113, 120a to block the propagation of operation noise of the reduction gear train to the outside.

Referring to FIG. 7, the primary module 100 is configured as an assembly in which the inner housing 110, the motor 130, the reduction gear train, the planetary gear set 170, the inner cap 120, the vibration and noise attenuating pad 136 and the elastic ring 137 are combined as a single unit.

In addition, the primary module 100 may be assembled as a single unit together with the vibration-attenuating damper member 190.

The vibration-attenuating damper member 190 is made of an elastic flexible material, for example a rubber with elasticity such as ethylene propylene diene monomer (EPDM).

The outer circumference of the vibration-attenuating damper member 190 has an uneven portion 191, and the uneven portion 191 closely adheres to the inner surface of the circumferential wall 212 of the outer housing 210 to enhance the vibration and noise attenuating function.

In addition, the vibration-attenuating damper member 190 has a coupling groove 192 formed in the circumferential inner wall, and the rim portion 112 of the inner housing 110 is fit into the coupling groove 192.

Moreover, in order to assemble the vibration-attenuating damper member 190 from a lower portion of the primary module 100 upwards, a bottom portion 193 closely adhering to the lower surface of the inner housing 110 is formed at the lower end of the rim portion 112, and openings 194, 195 are formed in the bottom portion 193 to allow the casing 132 of the motor 130 and the gear housing 180 of the planetary gear set 170 to pass through.

The primary module 100 configured as above is inserted into the outer housing 210, and finally the outer cap 220 is coupled thereto to completely make the final module 50 which is an actuator assembly.

If the surface of the ceiling surface 223 in the outer cap 220 is formed unevenly to have a lattice shape as shown in FIG. 7, the soundproof or sound-isolating function may be enhanced.

In addition, the outer cap 220 may have an inner wall 221 and an outer wall 222 which surround an inside and an outside of the circumferential wall 212 of the outer housing 210.

The inner wall 221 and the outer wall 222 of the outer cap 220 are closely adhered to the inner side and the outside of the circumferential wall 212 of the outer housing 210 by fitting and then joined thereto by ultrasonic welding, vibration welding or thermal welding.

Figure 8:
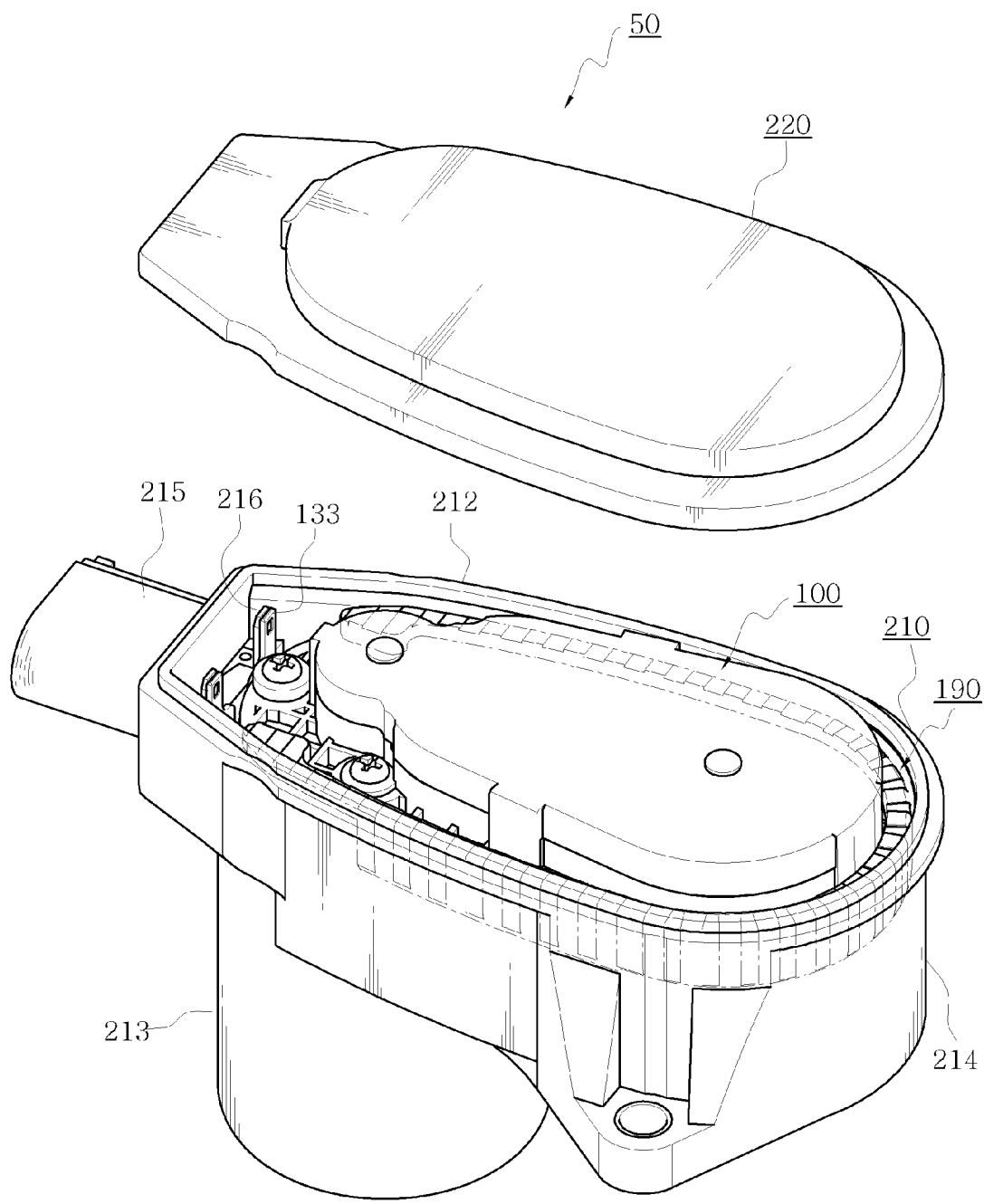
FIG. 8 is an exploded perspective view showing the primary module of the actuator according to the present disclosure, which is assembled to an outer housing.

FIG. 8 is an exploded perspective view showing the primary module of the actuator according to the present disclosure, which is assembled to an outer housing.

Referring to FIGS. 7 and 8, if the primary module 100 is inserted into the outer housing 210, the vibration-attenuating damper member 190 is interposed between the rim portion 112 of the inner housing 110 and the inner surface of the circumferential wall 212 of the outer housing 210 to maintain a gap between them. In addition, the vibration and noise attenuating pad 136 is interposed between the outer circumference of the motor 130 and the inner wall of the motor receiver 213 to maintain a gap between them. Moreover, the vibration-attenuating and gap-maintaining elastic ring 137 is interposed between the lower end of the motor 130 and the accommodating unit 213a of the motor receiver 213 to maintain a gap between them.

Figure 9:
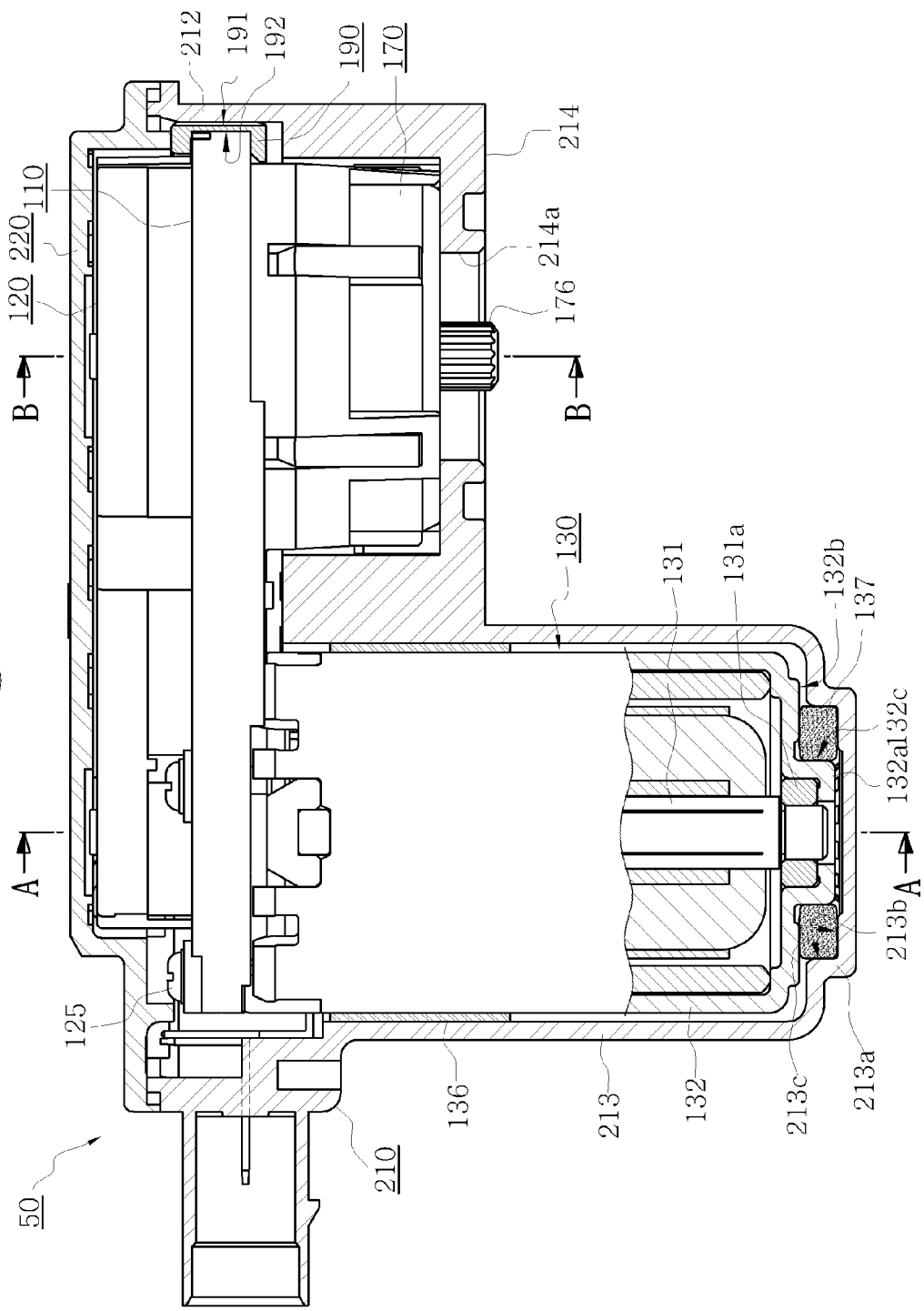
FIG. 9 is a front sectional view showing the actuator according to the present disclosure, for illustrating a vibration and noise attenuating structure of the primary module and the outer housing.
Figure 10:
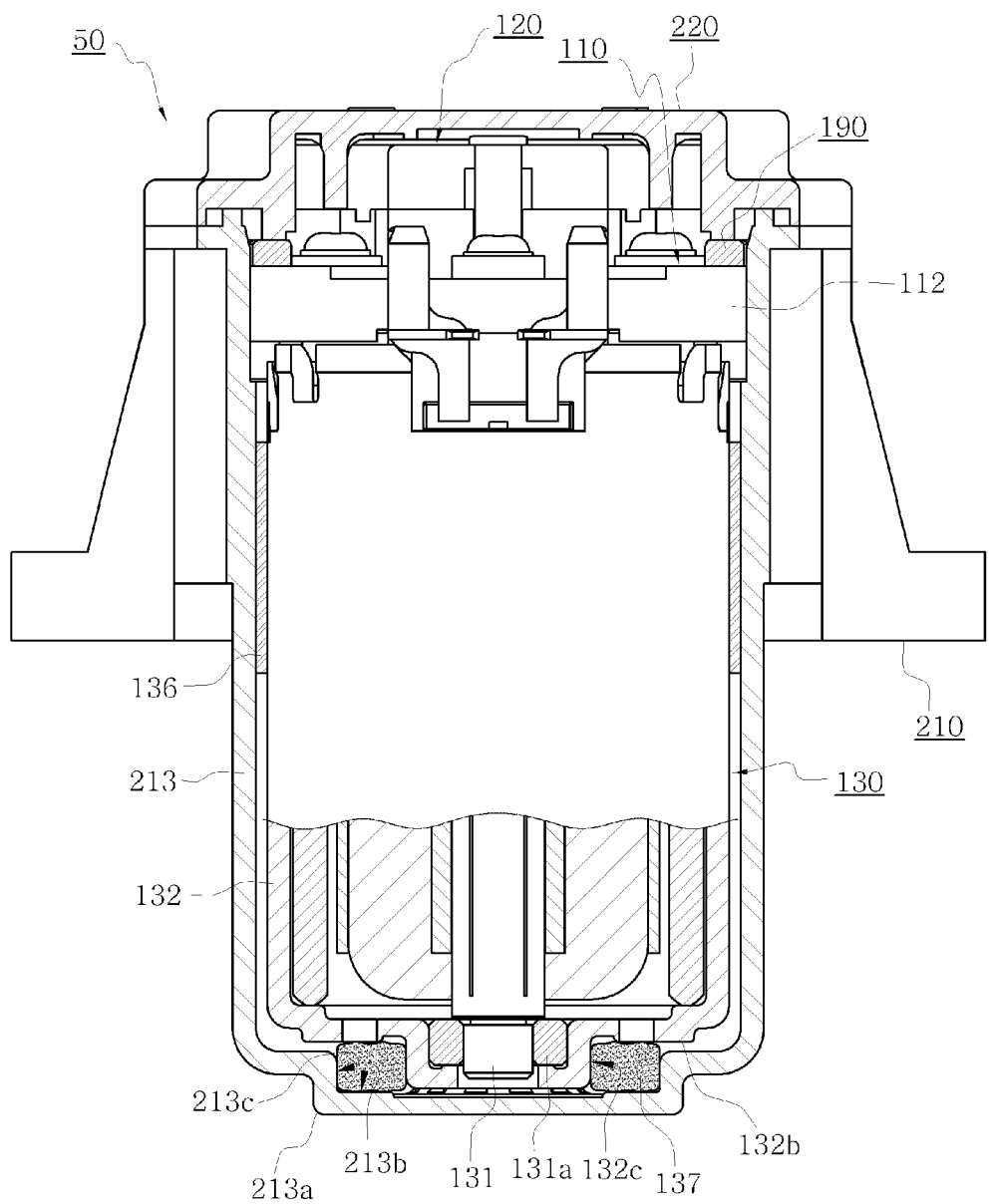
FIG. 10 is a sectional view, taken along the line A-A of FIG. 9.
Figure 11:
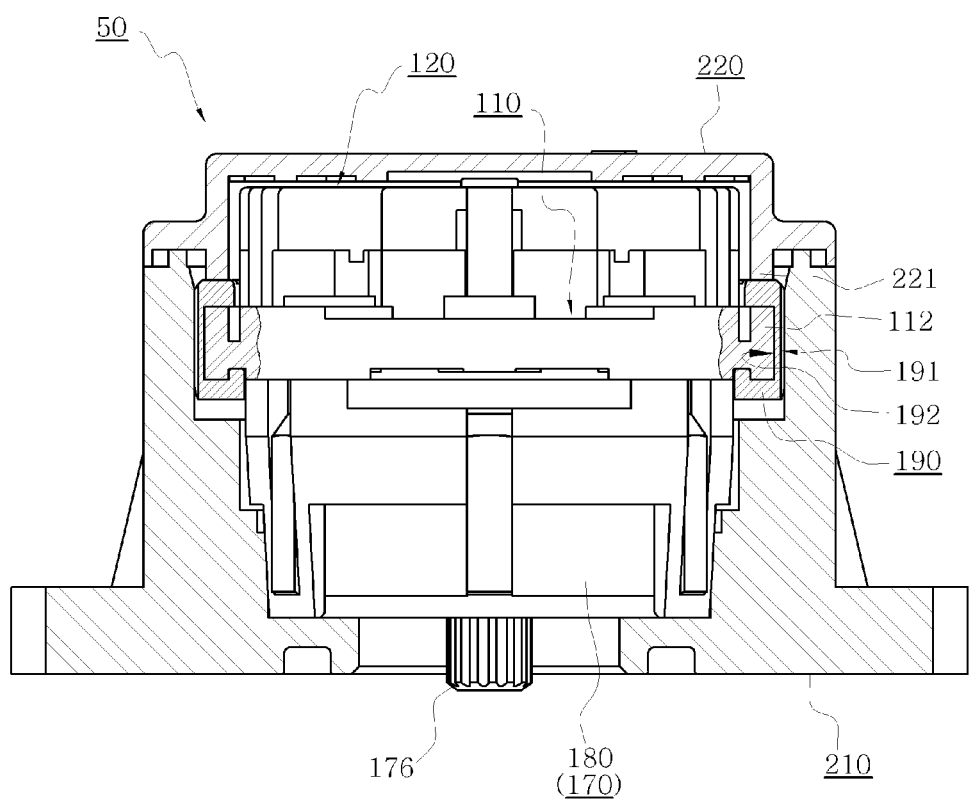
FIG. 11 is a sectional view, taken along the line B-B of FIG. 9.

FIG. 9 is a front sectional view showing the actuator according to the present disclosure, for illustrating a vibration and noise attenuating structure of the primary module and the outer housing. FIG. 10 is a sectional view, taken along the line A-A of FIG. 9. FIG. 11 is a sectional view, taken along the line B-B of FIG. 9.

Referring to FIGS. 9 and 10, the vibration and noise attenuating pad 136 is interposed between the outer circumference of the casing 132 of the motor 130 and the inner circumference of the outer housing 210.

The vibration and noise attenuating pad 136 is made of non-woven fabric, fiber, or pulp material and attenuates vibration and noise transferred between the motor 130 and the outer housing 210.

In addition, a shaft support 132a (see FIG. 7 together) for supporting the rotary shaft 131 protrudes from the lower portion of the casing 132 of the motor 130, an accommodating unit 213a (see FIG. 7 together) for accommodating the shaft support 132a protrudes from the bottom of the outer housing 210, and the vibration-attenuating and gap-maintaining elastic ring 137 is installed in a space between the shaft support 132a and the accommodating unit 213a.

The elastic ring 137 may be made of an elastic flexible material, for example a rubber with elasticity such as EPDM.

The elastic ring 137 attenuates vibration and noise and prevents propagation of the vibration and noise while maintaining the gap between the outer circumference of the shaft support 132a and the inner circumference of the accommodating unit 213a in a radial direction, and also attenuates vibration and noise and prevents propagation of the vibration and noise while maintaining the gap between the end surface 132b of the casing 132 of the motor 130 and the bottom surface of the outer housing 210.

FIG. 11 is a sectional view, taken along the line B-B of FIG. 9 and shows an installed state of the vibration-attenuating damper 190. FIG. 9 is also referred to together.

Referring to FIGS. 9 and 11, the coupling groove 192 of the vibration-attenuating damper 190 is coupled to the rim portion 112 of the inner housing 110. The vibration-attenuating damper member 190 attenuates vibration transferred between the inner housing 110 and the outer housing 210 while maintaining a gap between the rim portion 112 of the inner housing 110 and the circumferential wall 212 of the outer housing 210. The vibration attenuating function is enhanced by the uneven portion 191 formed at the outer surface of the vibration-attenuating damper 190.

Figure 12:
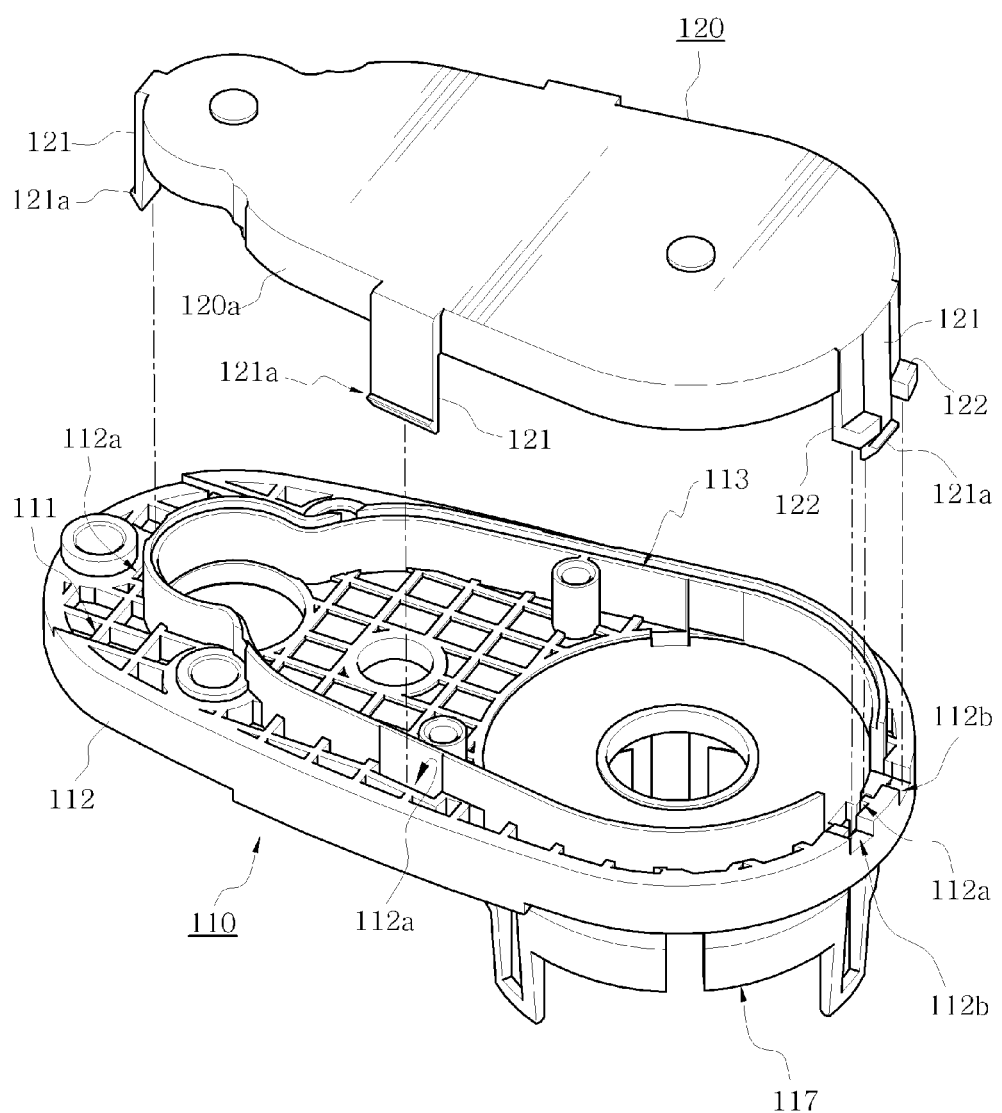
FIG. 12 is a perspective view for illustrating an assembled structure of an inner housing employed in the primary module of the actuator according to the present disclosure.
Figure 13:
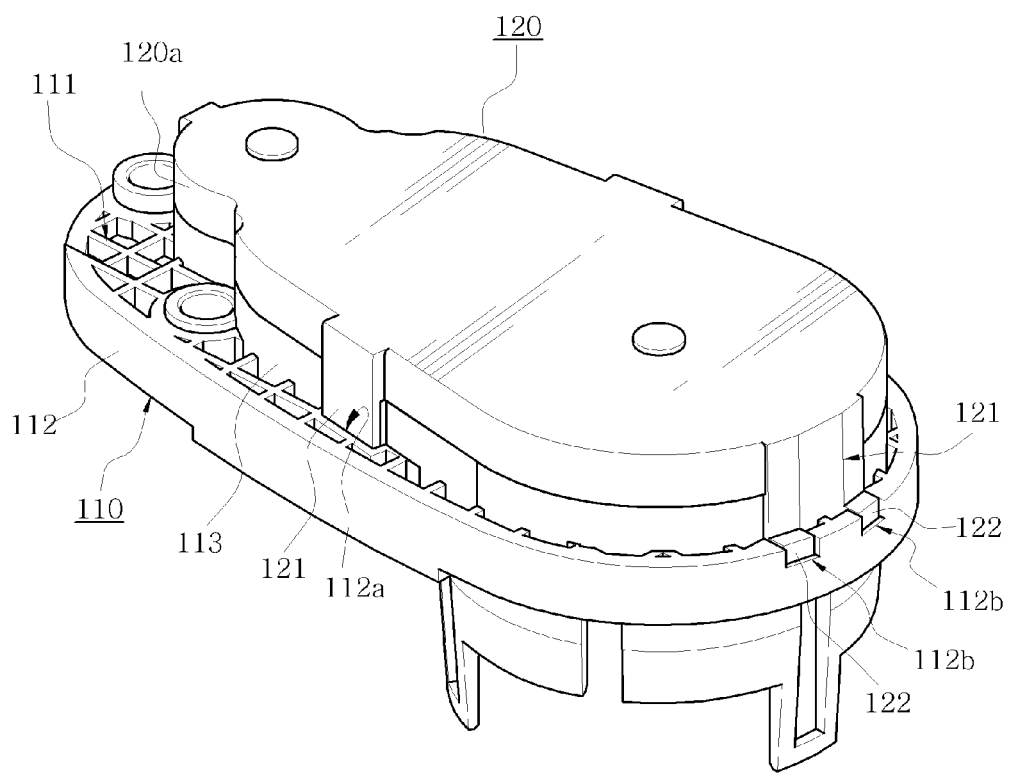
FIG. 13 is a perspective view showing that the inner housing of FIG. 12 is coupled to a cap.
Figure 14:
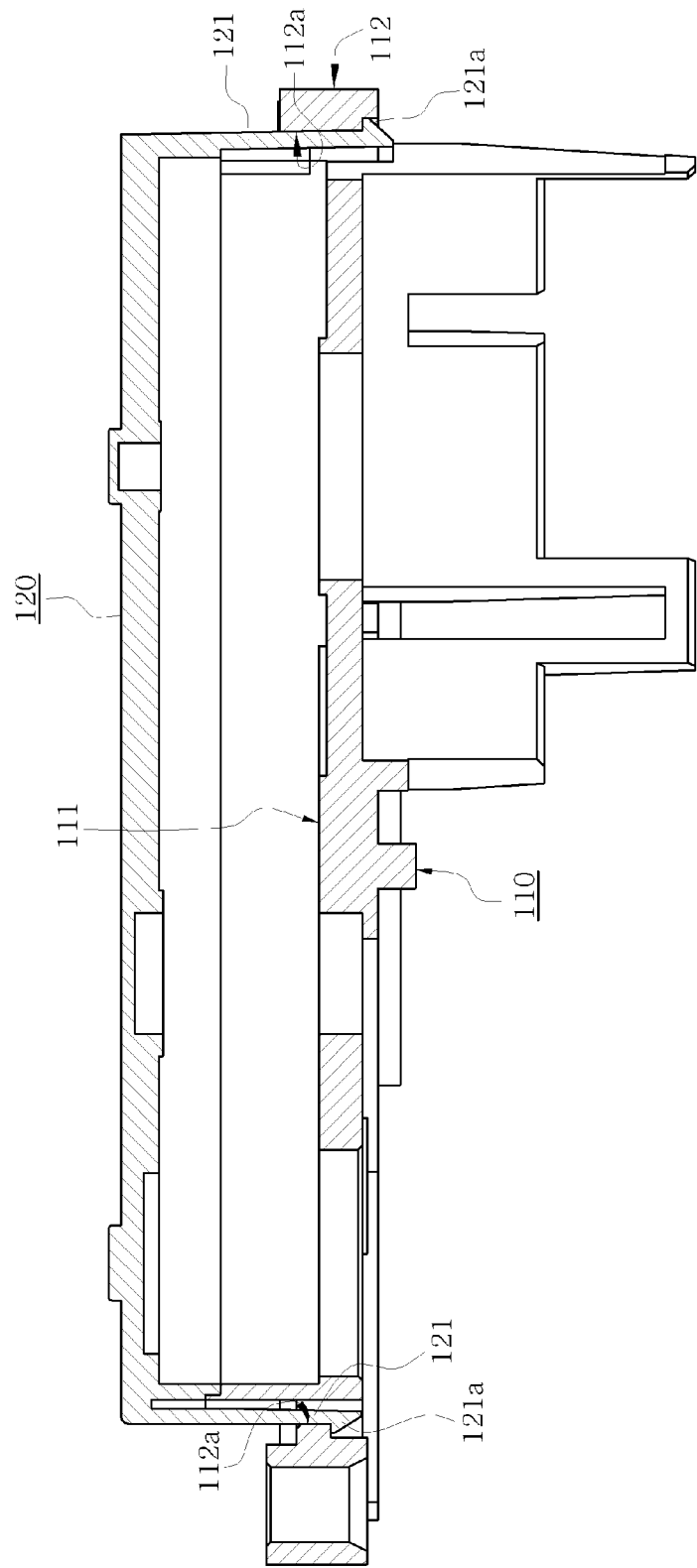
FIG. 14 is a front sectional view of FIG. 13.
Figure 15:
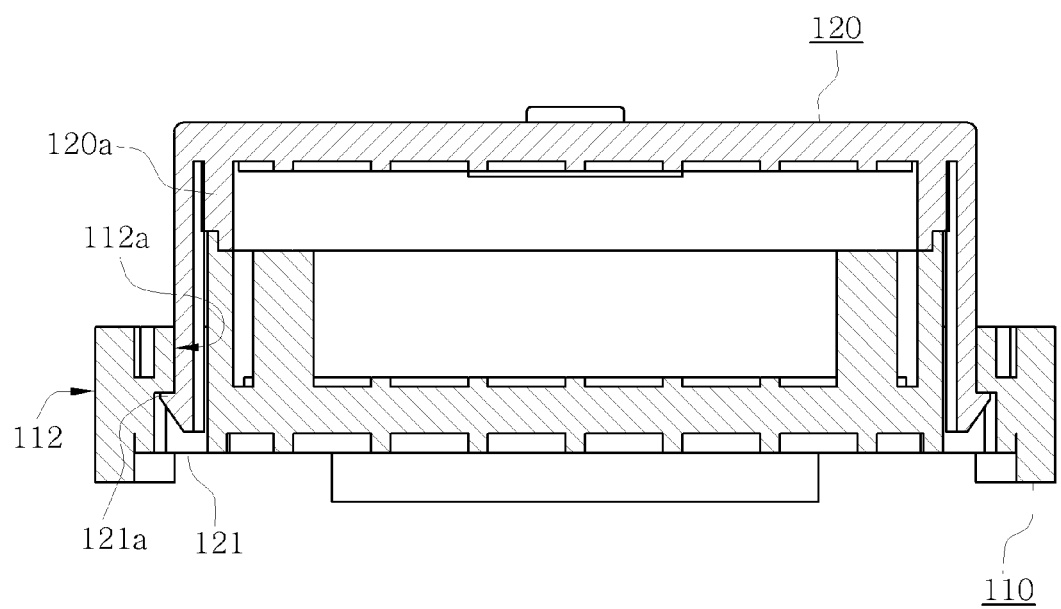
FIG. 15 is a cross-sectional view of FIG. 13.

FIG. 12 is a perspective view for illustrating an assembled structure of an inner housing employed in the primary module of the actuator according to the present disclosure. FIG. 13 is a perspective view showing that the inner housing of FIG. 12 is coupled to a cap. FIG. 14 is a front sectional view of FIG. 13. FIG. 15 is a cross-sectional view of FIG. 13.

As shown in FIGS. 12 to 15, a snap-fit strip 121 having a coupling protrusion 121a extends from an end of one of the inner cap 120 and the inner housing 110 (the inner cap 120 in the figures) toward the other thereof, and a snap-fit groove 112a is formed at the other thereof (the inner housing 110 in the figures) so that the snap-fit strip 121 is inserted thereto and the coupling protrusion 121a is hooked thereto.

In addition, a dowel plate 122 for determining an assembling point extends from one of the inner cap 120 and the inner housing 110 (the inner cap 120 in the figures) toward the other thereof, and a positioning groove 112b is formed at the other thereof (the inner housing 110 in the figures) so that the dowel plate 122 is inserted thereto to take the position thereof.

Therefore, if the inner cap 120 is coupled to the inner housing 110, the dowel plate 122 is inserted into the positioning groove 112b to take the position thereof, and the coupling protrusion 121a of the snap-fit strip 121 is hooked and fixed to the snap-fit groove 112a.

As described above, the inner housing 110 and the inner cap 120 are easily and conveniently assembled by means of snap-fitting. Therefore, the primary module 100 may be assembled very easily.

Figure 16:
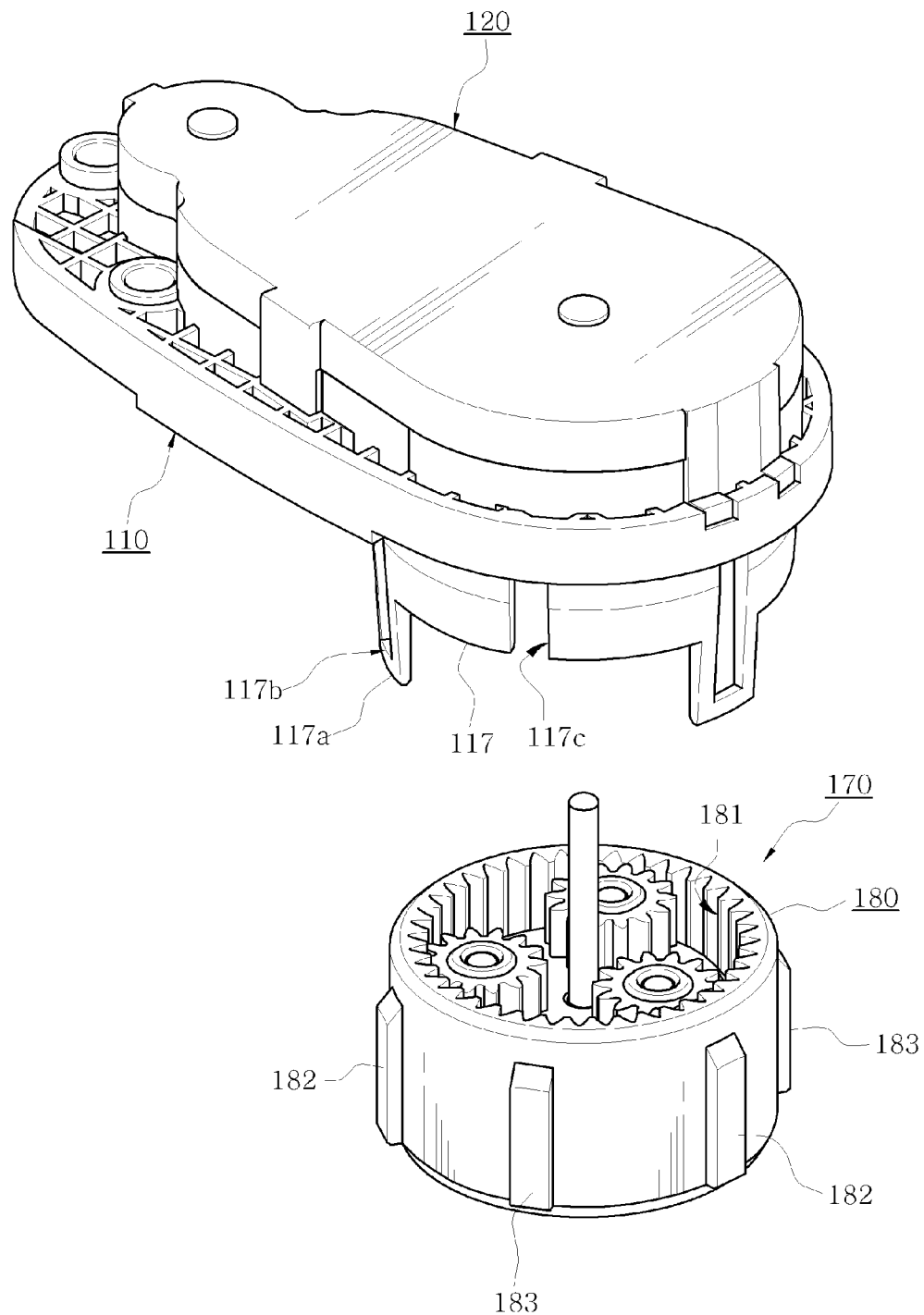
FIG. 16 is a perspective view for illustrating an assembled structure of the inner housing and the planetary gear set of the actuator according to the present disclosure.
Figure 17:
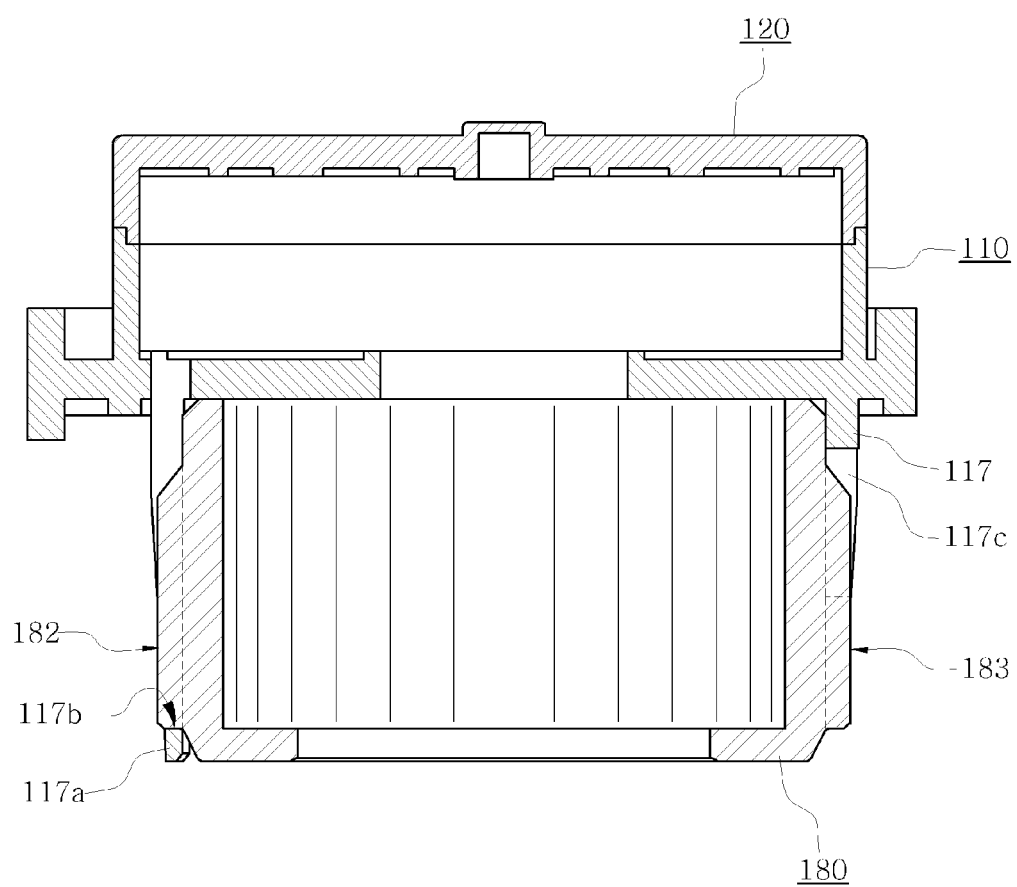
FIG. 17 is a sectional view showing a coupled state of the inner housing and the planetary gear set of FIG. 16.

FIG. 16 is a perspective view for illustrating an assembled structure of the inner housing 110 and the planetary gear set 170 of the actuator according to the present disclosure. FIG. 17 is a sectional view showing a coupled state of the inner housing 110 and the planetary gear set 170 of FIG. 16.

Referring to FIGS. 16 and 17, a snap-fit strip 117a having a snap-fit hole 117b extends from one of the lower surface of the inner housing 110 and the gear housing 180 of the planetary gear set 170 (the inner housing 110 in the figures) toward the other thereof, and a snap-fit protrusion 182 is formed at the other thereof (the gear housing 180 in the figures) so that the snap-fit hole 117b of the snap-fit strip 117a is inserted and hooked thereto.

In order to easily form the snap-fit strip 117a and firmly couple the gear housing 180, the skirt section 117 extends from the lower surface of the inner housing 110 so that the gear housing 180 of the planetary gear set 170 is inserted thereto. Therefore, the gear housing 180 of the planetary gear set 170 is inserted into the skirt section 117 and snap-fit thereto.

When the skirt section 117 is provided (in the embodiment depicted in the figures), the snap-fit strip 117a extends from the skirt section 117.

In other words, the snap-fit strip 117a having the snap-fit hole 117b extends from the skirt section 117 of the inner housing 110, and the snap-fit protrusion 182 is formed on the outer circumferential surface of the gear housing 180 of the planetary gear set 170 so as to be inserted and hooked to the snap-fit hole 117b of the snap-fit strip 117a.

Meanwhile, a positioning groove 117c for determining an assembling location of the gear housing 180 of the planetary gear set 170 is formed in the skirt section 117 of the inner housing 110, and a positioning protrusion 183 inserted into the positioning groove 117c to take the position thereof is formed at the outer circumferential surface of the gear housing 180 of the planetary gear set 170.

Therefore, if the gear housing 180 of the planetary gear set 170 is coupled to the inner housing 110, the positioning protrusion 183 is inserted into the positioning groove 117c to take the position thereof, and the snap-fit protrusion 182 is inserted and hooked to the snap-fit hole 117b of the snap-fit strip 117a.

As described above, the gear housing 180 of the planetary gear set 170 and the inner housing 110 are assembled easily and conveniently by means of snap-fitting. Therefore, the primary module 100 may be assembled very easily.

Figure 18:
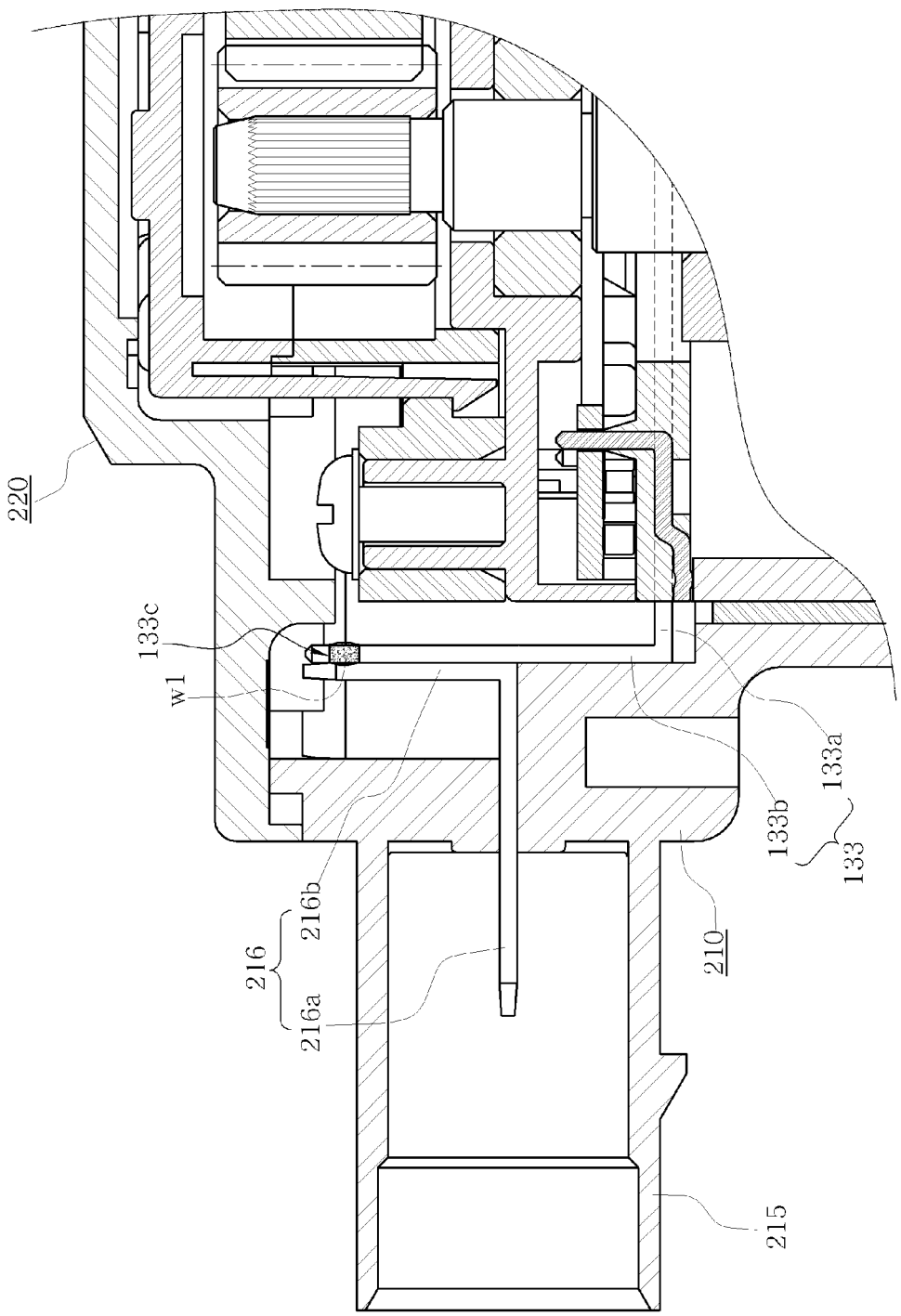
FIG. 18 is a sectional view showing an essential part of a terminal connection structure of the actuator according to the present disclosure.
Figure 19:
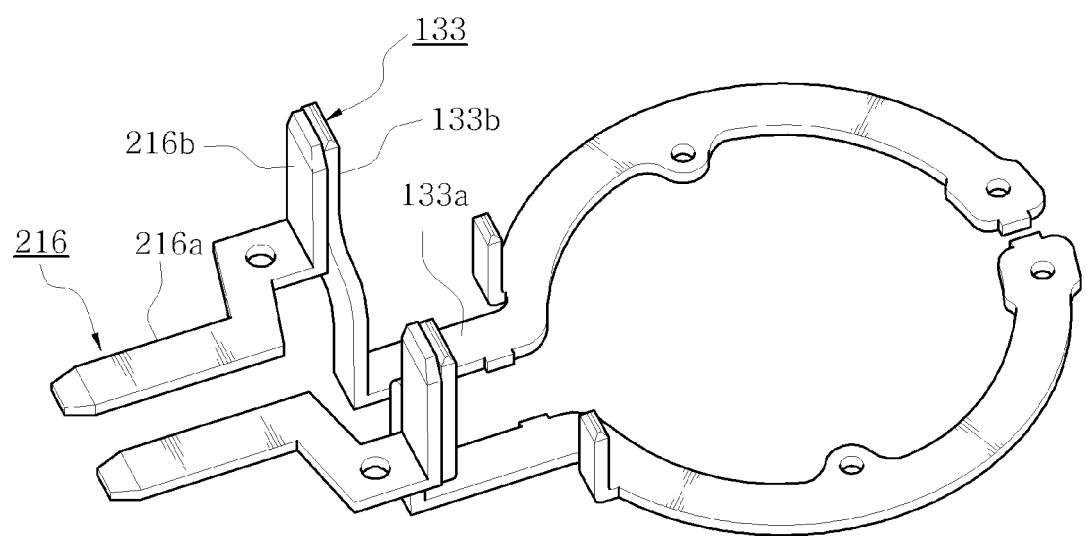
FIG. 19 is a perspective view showing an essential part of the terminal connection structure of the actuator according to the present disclosure.

FIGS. 18 and 19 are diagrams for illustrating a terminal connecting structure of the actuator according to the present disclosure. FIG. 18 is a sectional view of an essential part, and FIG. 19 is a perspective view of an essential part.

Referring to FIGS. 18 and 19, the outer terminal 216 for supplying power to the motor 130 includes a horizontal portion 216a connected to an outer connector and a bent portion 216b bent and extending from the horizontal portion 216a.

Along with it, the terminal strip 133 of the motor 130 has a bent portion 133b corresponding to the bent portion 216b of the outer terminal 216.

The bent portion 216b of the outer terminal 216 and the terminal strip 133 of the motor 130 are adhered in a surface-to-surface relation and joined to each other by a welding portion w1.

In a general terminal connecting structure, the outer terminal 216 and the terminal strip 133 are connected using a wire while maintaining a certain gap, which may be short-circuited or cause unstable electric connection due to vibration of a vehicle. In addition, noise may also be generated by a shaking wiper due to vibration of a vehicle engine.

In the present disclosure, since the outer terminal 216 and the terminal strip 133 are adhered in a surface-to-surface relation and joined by welding, the influence of noise is reduced, and short-circuiting is prevented, thereby improving durability and noise characteristics.

Further, a part of the outer terminal 216 including the horizontal portion 216a may be integrated with the outer housing 210 by means of insert injection molding.

By doing so, the final module 50 serving as an actuator assembly may be assembled more conveniently.

The exemplary embodiments of the present disclosure have been shown and described. However, the present disclosure is not limited thereto, and it will be understood by those skilled in the art that various changes in form and details may be made thereto without departing from the spirit and scope of the present disclosure as defined by the appended claims.

What is claimed is:
1. An actuator assembly for an electromechanical parking brake comprising;
   a casing of a motor and a gear housing of a planetary gear set are parallelly coupled to a lower surface of an inner housing;

a reduction gear train having a pinion gear and a drive gear for transmitting a power from a rotary shaft of the motor to the planetary gear set is received in an upper surface of the inner housing; and an inner cap covering the outer portion of the reduction gear train is coupled to the upper surface of the inner housing, thereby configuring a primary module which is a single small independent assembly in which the motor, the reduction gear train, the planetary gear set, the inner housing and the inner cap are comprised, wherein the primary module is inserted into an outer housing while keeping a gap at a circumference thereof, an outer cap is coupled to an upper portion of the outer housing to cover the primary module, and the primary module is surrounded by the outer housing and the outer cap, thereby configuring a final module which is a single large independent assembly in which inner components of the motor, the reduction gear train and the planetary gear set are surrounded doubly, and wherein a final output shaft of the planetary gear set is exposed from a lower through hole of the outer housing and connected to a parking brake, wherein the outer housing comprises a bottom portion on which the lower surface of the inner housing is placed;

a circumferential wall extending upwards at a circumference of the bottom portion to hide a side of the primary module;

wherein a vibration-attenuating damper member is installed in a space between a rim portion of the inner housing and the circumferential wall of the outer housing;

wherein the damper member has a coupling groove formed in a circumferential inner wall thereof;

the rim portion of the inner housing is fit into the coupling groove;

wherein the damper member is assembled below the primary module to face upwards;

a bottom portion is formed at a lower end of the rim portion to closely adhere to the lower surface of the inner housing; and openings are formed in the bottom portion to allow the casing of the motor and the gear housing of the planetary gear set to pass through.

2. The actuator assembly for an electromechanical parking brake according to claim 1, wherein the damper member is made of an elastic flexible material, and an outer circumference of the damper member adhering to the inner side of the circumferential wall of the outer housing has an uneven portion.

3. The actuator assembly for an electromechanical parking brake according to claim 1, wherein the outer housing includes a motor receiver extending downwards from the bottom portion and having a closed circumference and a closed bottom to accommodate the casing of the motor; and a planetary gear receiver extending downwards from the bottom portion and having a closed circumference and an open bottom to accommodate the gear housing of the planetary gear set.

4. The actuator assembly for an electromechanical parking brake according to claim 3, wherein a vibration and noise attenuating pad is interposed between the outer circumference of the casing of the motor and the inner circumference of the outer housing.

5. The actuator assembly for an electromechanical parking brake according to claim 4, wherein the vibration and noise attenuating pad is made of non-woven fabric, fiber, or pulp material.

6. The actuator assembly for an electromechanical parking brake according to claim 3, wherein a vibration attenuating and gap maintaining elastic ring is interposed between an end surface of the casing of the motor and a bottom surface of the outer housing.

7. The actuator assembly for an electromechanical parking brake according to claim 3, wherein a shaft support for supporting the rotary shaft protrudes and extends from the lower portion of the casing of the motor, an accommodating unit for accommodating the shaft support protrudes and extends from the bottom of the outer housing, and a vibration-attenuating and gap-maintaining elastic ring for supporting the shaft support and the accommodating unit is installed in a space between the shaft support and the accommodating unit to keep a gap with each other in an axial direction and in a radial direction.

8. The actuator assembly for an electromechanical parking brake according to claim 1, wherein a snap-fit strip having a coupling protrusion extends at an end of one of the inner cap and inner housing toward the other thereof, and a snap-fit groove is formed at the other thereof so that the snap-fit strip is inserted thereto and the coupling protrusion is hooked thereto.

9. The actuator assembly for an electromechanical parking brake according to claim 1, wherein the inner housing includes a bottom portion having a rim portion at an outer circumference thereof and a first noise dam extending to surround a periphery of the reduction gear train having the pinion gear and the drive gear installed at the upper surface of the bottom portion, the inner cap has a second noise dam corresponding to a circumferential contour of the first noise dam, and end surfaces of the first and second noise dams closely adhere to each other to prevent an operation noise generated from the reduction gear train therein from being propagated outwards.

10. The actuator assembly for an electromechanical parking brake according to claim 1, wherein a dowel plate for determining an assembling location extends from one of the inner cap and the inner housing toward the other thereof, and a positioning groove is formed in the other thereof so that the dowel plate is inserted thereto to take the position thereof.

11. The actuator assembly for an electromechanical parking brake according to claim 1, wherein a snap-fit strip having a snap-fit hole extends from one of the lower surface of the inner housing and the gear housing of the planetary gear set toward the other thereof, and a snap-fit protrusion is formed at the other thereof so that the snap-fit hole of the snap-fit strip is inserted and hooked thereto.

12. The actuator assembly for an electromechanical parking brake according to claim 1, wherein a skirt section extends from the lower surface of the inner housing so that the gear housing of the planetary gear set is inserted thereto, and the gear housing of the planetary gear set is inserted into the skirt section and snap-fit thereto.

13. The actuator assembly for an electromechanical parking brake according to claim 11, wherein a snap-fit strip having a snap-fit hole extends from a skirt section of the inner housing, and wherein a snap-fit protrusion is formed at the outer circumferential surface of the gear housing of the planetary gear set to be inserted into and hooked by the snap-fit hole of the snap-fit strip.

14. The actuator assembly for an electromechanical parking brake according to claim 12, wherein a positioning groove for determining an assembling location of the gear housing of the planetary gear set is formed at the skirt section of the inner housing, and a positioning protrusion is formed at the outer circumferential surface of the gear housing of the planetary gear set to be inserted into the positioning groove to take the position thereof.

15. The actuator assembly for an electromechanical parking brake according to claim 1, wherein an outer terminal for supplying a power to the motor includes a horizontal portion connected to an outer connector, and a bent portion extending from the horizontal portion, wherein a terminal strip of the motor includes a bent portion closely adhering to the bent portion of the outer terminal in a surface-to-surface relation, and wherein the bent portion of the outer terminal and the bent portion of the terminal strip are joined together.

16. The actuator assembly for an electromechanical parking brake according to claim 15, wherein a part of the outer terminal, which includes the horizontal portion, is integrated with the outer housing.

17. The actuator assembly for an electromechanical parking brake according to claim 1, wherein the reduction gear train including the pinion gear and the drive gear is made of a plastic and the reduction gear is configured with a helical gear.

* * * * *